(12) United States Patent
Holloway et al.

(10) Patent No.: US 8,810,549 B2
(45) Date of Patent: Aug. 19, 2014

(54) PROJECTION SYSTEMS FOR TOUCH INPUT DEVICES

(75) Inventors: Warwick Holloway, Kambah (AU);
Robert Bruce Charters, Palmerston (AU); Duncan Ian Ross, Acton (AU)

(73) Assignee: Zetta Research and Development LLC—RPO Series, Wilmington, DE (US)

( * ) Notice: Subject to any disclaimer, the term of this patent is extended or adjusted under 35 U.S.C. 154(b) by 189 days.

(21) Appl. No.: 13/497,754

(22) PCT Filed: Sep. 22, 2010

(86) PCT No.: PCT/AU2010/001232
§ 371 (c)(1),
(2), (4) Date: Jun. 7, 2012

(87) PCT Pub. No.: WO2011/035370
PCT Pub. Date: Mar. 31, 2011

(65) Prior Publication Data
US 2013/0027352 A1 Jan. 31, 2013

(30) Foreign Application Priority Data
Sep. 22, 2009 (AU) .............................. 2009904577

(51) Int. Cl.
*G06F 3/042* (2006.01)
(52) U.S. Cl.
USPC ..................................................... 345/175
(58) Field of Classification Search
None
See application file for complete search history.

(56) References Cited

U.S. PATENT DOCUMENTS 6,525,677 B1 * 2/2003 Printzis ........................... 341/31
2008/0278460 A1 * 11/2008 Arnett et al. ................... 345/175

* cited by examiner

*Primary Examiner* — Nicholas Lee
(74) *Attorney, Agent, or Firm* — Mattingly & Malur, PC

(57) ABSTRACT

In infrared touch input devices that detect and locate a touch object from the blocking of light paths propagating along the X,Y axes, an ambiguity arises when two touch objects are present. This ambiguity can be resolved by the provision of additional light paths angled to the X,Y axes. The present invention provides projection systems that include a light splitting element for splitting collimated sheet of light into two or more sets of beam paths, thereby providing the additional light paths for resolving the double touch ambiguity. In preferred embodiments the light splitting element is in the form of a prism film.

19 Claims, 31 Drawing Sheets

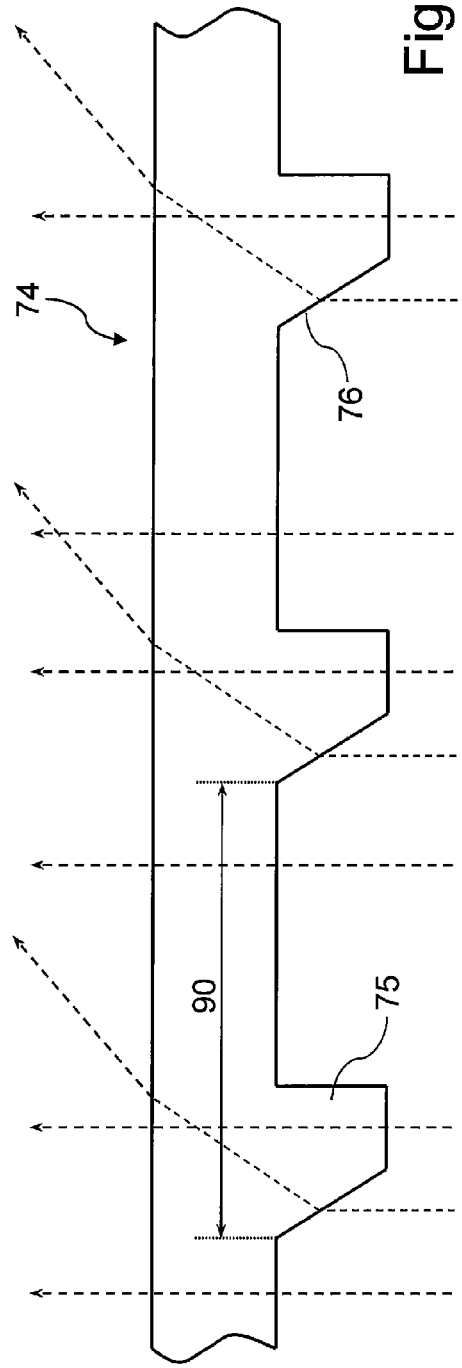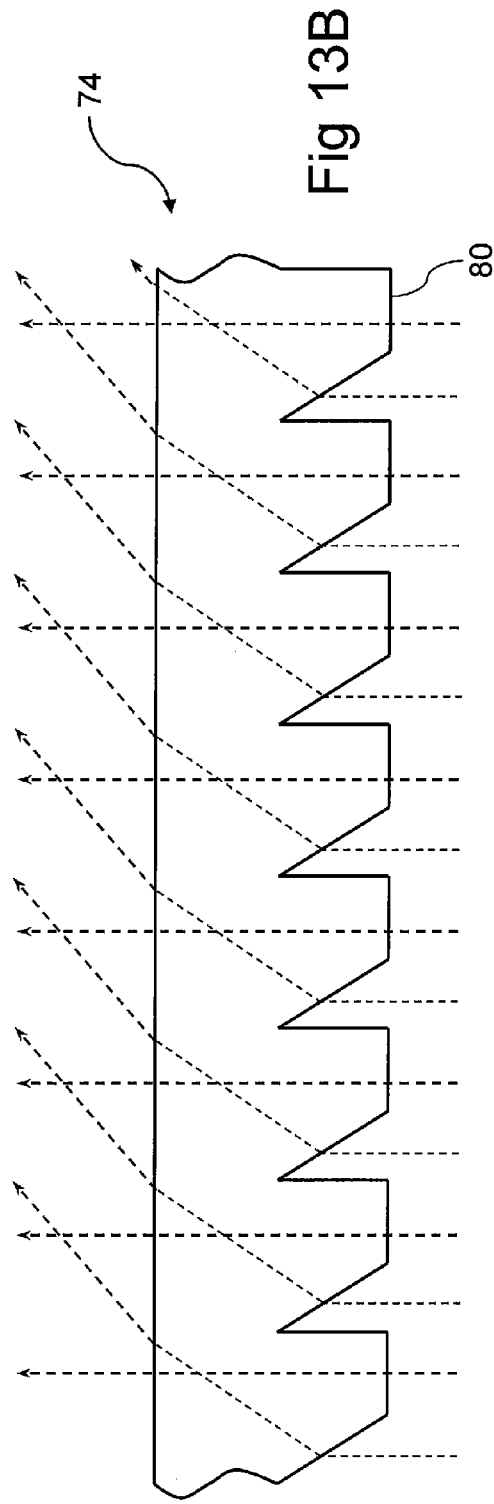

PROJECTION SYSTEMS FOR TOUCH INPUT DEVICES

CROSS-REFERENCE TO RELATED APPLICATIONS

This application is a U.S. national stage filing under 35 USC §371 of International Patent Application No. PCT/AU2010/001232 filed on Sep. 22, 2010, which claims priority under the Paris Convention to the Australian Patent Application No. 2009/904577, filed on Sep. 22, 2009.

FIELD OF THE INVENTION DISCLOSURE

The present invention relates to projection systems and in particular to the use of such projection systems in touch input devices. The invention has been developed primarily to improve the multi-touch capability of light-based touch input devices and will be described hereinafter with reference to this application. However, it will be appreciated that the invention is not limited to this particular field of use.

BACKGROUND OF THE INVENTION DISCLOSURE

Any discussion of the prior art throughout the specification should in no way be considered as an admission that such prior art is widely known or forms part of the common general knowledge in the field.

Input devices based on touch sensing (touch screens) have long been used in electronic devices such as computers, personal digital assistants (PDAs), handheld games and point of sale kiosks, and are now appearing in other portable consumer electronics devices such as mobile phones. Generally, touch-enabled devices allow a user to interact with the device by touching one or more graphical elements, such as icons or keys of a virtual keyboard, presented on a display.

Several touch-sensing technologies are known, including resistive, surface capacitive, projected capacitive, surface acoustic wave, optical and infrared, all of which have advantages and disadvantages in areas such as cost, reliability, ease of viewing in bright light, ability to sense different types of touch object, e.g. finger, gloved finger, stylus, and single or multi-touch capability.

The various touch-sensing technologies known differ widely in their multi-touch capability, i.e. their performance when faced with two or more simultaneous touch events. Some early touch-sensing technologies such as resistive and surface capacitive are completely unsuited to detecting multiple touch events, reporting two simultaneous touch events as a 'phantom touch' halfway between the two actual points. Certain other touch-sensing technologies have good multi-touch capability but are disadvantageous in other respects. For example projected capacitive touch screens, discussed in US Patent Application Publication No 2006/0097991 A1, only sense certain touch objects (e.g. gloved fingers and non-conductive styluses are unsuitable) and use high refractive index transparent conductive films that are well known to reduce display viewability, particularly in bright sunlight. In another example video camera-based systems, discussed in US Patent Application Publication Nos 2006/0284874 A1 and 2008/0029691 A1, are extremely bulky and unsuitable for hand-held devices. Another touch technology with good multi-touch capability is 'in-cell' touch, where an array of sensors are integrated with the display pixels of a display (such as an LCD or OLED display). These sensors are usually photo-detectors (disclosed in U.S. Pat. No. 7,166,966 and US Patent Application Publication No 2006/0033016 A1 for example), but variations involving micro-switches (US 2006/0001651 A1) and variable capacitors (US 2008/0055267 A1), among others, are also known. In-cell approaches cannot be retro-fitted and generally add complexity to the manufacture and control of the displays in which the sensors are integrated. Furthermore those that rely on ambient light shadowing cannot function in low light conditions.

In yet another approach to touch sensing with several possible configurations, a touch event is detected by the shadowing of two paths in a sheet of light (usually in the infrared region) established in front of a display. In one such configuration, illustrated in FIG. 1 and described in U.S. Pat. Nos. 4,507,557, 6,943,779 and 7,015,894, a touch input device 1 includes a pair of optical units 2 in adjacent corners of a rectangular input area 4 and a retro-reflective layer 6 along three edges of the input area. Each optical unit includes a light source emitting a fan of light 8 across the input area, and a photo-detector array (e.g. a line camera) where each detector pixel receives light retro-reflected from a certain portion of the retro-reflective layer 6. A touch object 10 in the input area prevents retro-reflected light reaching one or more detector pixels in each photo-detector array, and its position is determined by triangulation. For the purposes of this specification, touch input devices that operate in this manner will be referred to as 'optical' touch input devices.

In another configuration, illustrated in FIG. 2 and described in U.S. Pat. Nos. 3,478,220 and 3,764,813, a touch input device 11 includes arrays of discrete light sources 12 (e.g. LEDs) along two adjacent sides of a rectangular input area 4 emitting two sets of parallel beams of light 16 towards opposing arrays of photo-detectors 14 along the other two sides of the input area. If a touch object 10 in the input area blocks a substantial portion of at least one beam in each of the two axes, its location can be readily determined.

In a variant touch input device 17 that greatly reduces the optoelectronic component count, illustrated in FIG. 3 and described in U.S. Pat. No. 5,914,709, the arrays of light sources are replaced by arrays of 'transmit' optical waveguides 18 integrated on an L-shaped substrate 20 that distribute light from a single light source 12 via a 1×N splitter 21 to produce a grid of light beams 16, and the arrays of photo-detectors are replaced by arrays of 'receive' optical waveguides 22 integrated on another L-shaped substrate 23 that collect the light beams and conduct them to a detector array 24 (e.g. a line camera or a digital camera chip). Each optical waveguide includes an in-plane lens 26 that collimates the signal light in the plane of the input area 4, and the input device may also include cylindrically curved vertical collimating lenses (VCLs) 28 to collimate the signal light in the out-of-plane direction. As in the input device 11 of FIG. 2, a touch object is located from the beams blocked in each axis. For simplicity, FIG. 3 only shows four waveguides per side of the input area 4; in actual touch input devices the in-plane lenses will be sufficiently closely spaced such that the smallest likely touch object will block a substantial portion of at least one beam in each axis.

In yet another variant touch input device 30 shown in FIG. 4 and disclosed in US Patent Application Publication No 2008/0278460 A1, entitled 'A transmissive body' and incorporated herein by reference, the 'transmit' waveguides 18 and their in-plane lenses 26 of the device 17 shown in FIG. 3 are replaced by a transmissive body 32 including a planar transmissive element 34 and two collimation/redirection elements 36 that include parabolic reflectors 38. Infrared light 40 from a pair of optical sources 12 is launched into the transmissive element, then collimated and re-directed by the collimation/ redirection elements to produce two sheets of light 42 that propagate in front of the transmissive element towards the receive waveguides 22, so that a touch object can be detected and its dimensions determined from those portions of the light sheets 42 blocked by the touch object. Clearly the transmissive element 34 needs to be transparent to the infrared light 40 emitted by the optical sources 12, and it also needs to be transparent to visible light if there is an underlying display (not shown). Alternatively, a display may be located between the transmissive element and the light sheets 42, in which case the transmissive element need not be transparent to visible light.

A common feature of the touch input devices shown in FIGS. 2, 3 and 4 is that the sensing light is provided in two fields containing parallel rays of light, either as discrete beams (FIGS. 2 and 3) or as more or less uniform sheets of light (FIG. 4). The axes of the two light fields are usually perpendicular to each other and to the sides of the input area, although this is not essential (see for example U.S. Pat. No. 5,414,413). For the purposes of this specification, touch input devices that operate in this manner will be referred to as 'infrared' touch input devices. However it should be understood that the wavelength of the sensing light need not be in the infrared region, but could be in the visible for example.

In all of the 'optical' and 'infrared' touch input devices shown in FIGS. 1 to 4, a touch event is detected by the shadowing of two light paths. Turning now to the issue of multi-touch capability, although these touch input devices can detect the presence of multiple touch events, they are often unable to determine their locations unambiguously. In general, n simultaneous touch events will be detected as $n^2$ 'candidate points', of which $n(n-1)$ will be 'phantom points'. For the simplest multi-touch situation n=2 ('double touch'), the responses of an 'optical' touch input device 1 and an 'infrared' touch input device 11 are illustrated in FIGS. 5 and 6 respectively; in each case the 'candidate points' include the two actual touch points 10 and two 'phantom points' 44 at the corners of a quadrilateral, and it can be difficult if not impossible to identify the correct pair without further information. It will be appreciated that the variant 'infrared' touch input devices of FIGS. 3 and 4 will also respond in the manner shown in FIG. 6. In some circumstances the correct pair can be identified via some form of extra information: for example as explained in U.S. Pat. No. 6,856,259, touch-down and lift-off timing, relative object sizes and expected touch locations can all be of use in resolving the ambiguity.

However even if the correct pair can be identified, say because one touch-down occurred before the other, further complications can arise if the detection system has to track moving touch objects. For example if two moving touch objects (FIG. 7A) on an 'infrared' touch input device 11 move into an 'eclipse' state (FIG. 7B), the ambiguity between the actual points 10 and the phantom points 44 recurs when the objects move out of the eclipse state. FIGS. 7C and 7D illustrate two possible motions out of the eclipse state shown in FIG. 7B that in general are indistinguishable to the controller of the touch input device. It will be appreciated that a similar problem occurs with 'optical' touch input devices when two moving touch objects move into an 'eclipse' state.

For 'optical' touch input devices, various modifications are known that improve their multi-touch capability. Referring to FIG. 5, in one modification disclosed in US Patent Application Publication No 2006/0232830 A1, the two optical units 2 are replaced by binocular units each containing two slightly offset combinations of an emitter and a photo-detector array. If a double touch ambiguity is detected using one emitter/detector combination in each corner, the other combinations are activated. When comparing the candidate points obtained from the different combinations, the actual touch points 10 remain fixed while the 'phantom points' 44 appear to move, and can therefore be eliminated. US 2006/0232830 A1 also discusses another modification where a third optical unit, this time containing an emitter and a photo-detector array with a 180° field of view, is located in the middle of the input area edge between the two optical units 2. This third optical unit also makes use of the retro-reflective layer 6. It will be appreciated that because 'infrared' touch input devices have a very different configuration where the emitters and detectors are spaced apart across the input area, these known solutions for improving the multi-touch capability of 'optical' touch input devices are not necessarily applicable to 'infrared' touch input devices.

INVENTION SUMMARY OF THE DISCLOSURE

It is an object of the present invention to overcome or ameliorate at least one of the disadvantages of the prior art, or to provide a useful alternative. It is an object of the invention in its preferred form to provide projection systems for infrared touch input devices with improved multi-touch capability.

According to a first aspect the present invention provides a projection system for a touch input device, said projection system comprising:
  a first light emitter adapted to emit substantially planar substantially collimated light propagating in a first direction; and
  an optical splitting element adapted to split at least a portion of said substantially planar substantially collimated light into a second direction, different from said first direction.

It will be appreciated that the projection system of the invention comprises apparatus for producing an input signal for a touch input device, wherein the input signal comprises substantially planar substantially collimated light propagating in the first and second directions. Further, it will be appreciated that the touch input device comprises an input area, and that the optical splitting element is positioned between the first light emitter and the input area. It will be understood that light which is 'split' is light which is split off from the incident light and redirected or diverted to a different direction.

Preferably the substantially planar substantially collimated light propagating in the first and second directions propagate parallel to the plane of the input area of said touch input device.

It will be appreciated that the optical splitting element is adapted to split at least a portion of the substantially planar substantially collimated light propagating in the first direction into a second direction, different from said first direction. In one embodiment, where the substantially planar substantially collimated light propagating in the first direction is a relatively 'thick' sheet of light (say, 10 to 100 microns thick), the portion split into the second direction is an upper (or a lower) portion of the substantially planar substantially collimated light produced by the first light emitter, and the lower (or upper) portion of the substantially planar substantially collimated light continues to propagate, or is allowed to continue to propagate, in the first direction and to traverse the input area of the input device. It will be appreciated that this is effectively a layered structure of a pair of propagating sheets of light. In other embodiments, a 'sandwich' structure can be provided, wherein an upper portion is split into the second direction, a middle portion is allowed to propagate in the first direction, and the lower portion is split into yet another direction, or combinations thereof.

In an alternative embodiment, where the substantially planar substantially collimated light propagating in the first direction is a relatively 'thin' sheet of light (say, 1 to 5 microns thick), the portion of the substantially planar substantially collimated light split into a second direction is parallel with the light propagating in the first direction. Preferably, in this embodiment, a plurality of spaced portions of light propagating in the first direction are split off by the optical splitting element and redirected into the second direction, thereby to produce a parallel array of light beams propagating in the second direction. In this embodiment the interstitial light not redirected into the second direction is allowed to continue to propagate in the first direction and traverse the input area of the input device. In other words, the optical splitting element splits a plurality of portions of the substantially planar substantially collimated light to produce a plurality of substantially parallel beams of light propagating in said second direction.

Preferably the optical splitting element comprises a prism film or a phase mask such that said substantially planar substantially collimated light propagating in said first and second directions each comprises a plurality of substantially parallel collimated beams of light.

Preferably the optical splitting element is formed on or is integral with an output face of an optical element comprising the first light emitter such that said substantially planar substantially collimated light propagating in said first and second directions each comprises a plurality of substantially parallel collimated beams of light. Preferably each said collimated beam of light is about 0.05 to 5 mm in width. However, it will be appreciated that the widths of the individual beams of light in the first direction may not be the same as the width of those propagating in the second direction.

In one embodiment, the first direction is preferably substantially perpendicular to the output face of the optical splitting element. In this embodiment the first and the second directions are oriented at about 30 to 60 degrees to each other, for example about 45 degrees.

In the embodiment as discussed above, the optical splitting element is adapted to permit a portion of the light propagating in the first direction to continue to propagate in the first direction and traverse the input area of the input device, and a portion of the light is split off into the second direction, which for example is about 45 degrees to the first direction. However, in an alternative embodiment the optical splitting element is adapted to also split a further portion of the substantially planar substantially collimated light propagating in the first direction into a third direction, different from said first and said second directions. In this 'Y' embodiment, the leg of the 'Y' can be thought of as the first direction, and the arms of the 'Y' are the second and third directions, which are preferably about 90 degrees to each other. In yet further embodiments, the 'Y' embodiment also includes a portion of light propagating in the first direction. In other words, the optical splitting element is adapted to permit light to propagate in the first direction, as well as splitting light into the second and third directions, and all three 'sheets' of light traverse the input area of the input device.

Preferably the input area of the input device is rectangular, with first and fourth mutually opposing sides, and second and third mutually opposing sides. The first light emitter is positioned along the first side of the rectangular input area, and mutually opposed first and second reflectors are positioned along the second and third sides respectively. Positioned along the fourth side are suitable light detectors. It will be appreciated that the light propagating in the first direction propagates across the rectangular input area of the input device, and is received in a first set of detectors positioned along the fourth side. Light propagating in the second direction is reflected off the relevant reflector and then received in a second set of detectors positioned along the fourth side. In the case of the "Y" embodiment above, light propagating in the third direction is reflected off the other reflector and is received in a third set of detectors positioned along the fourth side.

In related embodiments, a second light emitter is provided which is adapted to emit substantially planar substantially collimated light propagating in a fourth direction. The second light emitter is positioned about the periphery of the rectangular input area such that the fourth direction is at substantially 90 degrees to the first direction. Preferably a further optical splitting element is provided adjacent the second light emitter, and is adapted to split at least a portion of said substantially planar substantially collimated light propagating in said fourth direction into a fifth direction, different from said fourth direction.

Preferably the fourth and fifth directions are at about 45 degrees to each other.

Preferably the substantially planar substantially collimated light propagating in said fourth and fifth directions propagates in a direction which is co-planar with or parallel to the plane of the input area of the input device.

It will be appreciated that the further optical splitting element is positioned between the second light emitter and the input area of the input device.

In preferred embodiments the first and second light emitters each comprise a transmissive body comprising a transmissive element adapted to receive, confine and transmit an optical signal in the form of light in substantially planar form, and a collimation and redirection element adapted to substantially collimate and redirect an optical signal, wherein the elements are arranged to receive an optical signal from an optical source and transmit, collimate and redirect the optical signal to produce a substantially collimated signal in a substantially planar form propagating in the first and fourth directions, respectively. In an alternative but related embodiment, the collimation and redirection element comprises a.) a collimation element adapted to substantially collimate an optical signal, and b.) a redirection element adapted to redirect an optical signal, wherein the elements a.) and b.) are arranged to receive an optical signal from an optical source and transmit, collimate and redirect the optical signal to produce a substantially collimated signal in a substantially planar form.

Preferably the first and second light emitters comprise a transmissive body comprising a transmissive element adapted to receive, confine and transmit an optical signal in planar form, and collimation and redirection elements adapted to substantially collimate and redirect optical signals, wherein the elements are arranged to receive first and second optical signals from one or more optical sources and transmit, collimate and redirect said first and second optical signals to produce substantially collimated signals in substantially planar form propagating in said first and fourth directions, respectively.

In preferred embodiments, the first light emitter comprises a plurality of optical sources positioned along a side of the input area of the input device. Alternatively, the first light emitter comprises a plurality of optical waveguides, wherein the distal ends of the optical waveguides are optically coupled to an optical source, and the proximal ends of the optical waveguides are positioned along a side of an input area of said input device.

Preferably the substantially planar substantially collimated light propagating in said first, second, third, fourth, etc. . . .

directions are received in corresponding light detecting elements for detecting a touch on or near the input area of the input device.

According to a second aspect the present invention provides a projection system for a touch input device, said projection system comprising:
  a transmissive body comprising:
    a collimation element adapted to substantially collimate an optical signal; and
    a redirection element adapted to substantially redirect an optical signal,
    wherein said collimation and redirection elements are arranged to receive a substantially planar optical signal and collimate and redirect said optical signal to produce a substantially collimated substantially planar signal propagating in a first direction; and
  an optical splitting element adapted to split at least a portion of said substantially collimated substantially planar signal into a second direction, different from said first direction.

Preferably the optical signal is light, and the apparatus comprises an optical source for providing said light. Preferably the light is split into two or more sets of light paths propagating at an angle to each other.

Preferably the transmissive body further comprises a transmissive element adapted to receive, confine and transmit an optical signal in substantially planar form.

According to a third aspect the present invention provides a projection system for a touch input device, said projection system comprising:
  a transmissive body comprising a collimation and redirection element adapted to receive a substantially planar optical signal and collimate and redirect said optical signal to produce a substantially collimated substantially planar signal propagating in a first direction; and
  an optical splitting element adapted to split at least a portion of said substantially collimated substantially planar signal into a second direction, different from said first direction.

Preferably the optical signal is light.

Preferably the substantially collimated planar signals propagating in said first and said second directions are directed to corresponding light detecting elements for detecting an input.

According to a fourth aspect the present invention provides a touch input device comprising the apparatus according to the first, second or third aspects.

According to a fifth aspect the present invention provides a method for producing an input signal for an input device, said method comprising the steps of:
  providing a substantially planar substantially collimated optical signal propagating in a first direction;
  splitting at least a portion of said substantially planar substantially collimated optical signal into a second direction, different from said first direction; and
  receiving said optical signals propagating in said first and second directions in corresponding light detecting elements for detecting an input.

BRIEF DESCRIPTION OF THE DRAWINGS

Preferred embodiments of the invention will now be described, by way of example only, with reference to the accompanying drawings in which:

FIGS. 13A and 13B show sections of two prism films suitable for use as the optical splitting element in a projection system according to the first embodiment;

DETAILED DESCRIPTION OF THE DISCLOSURE

Figure 4:
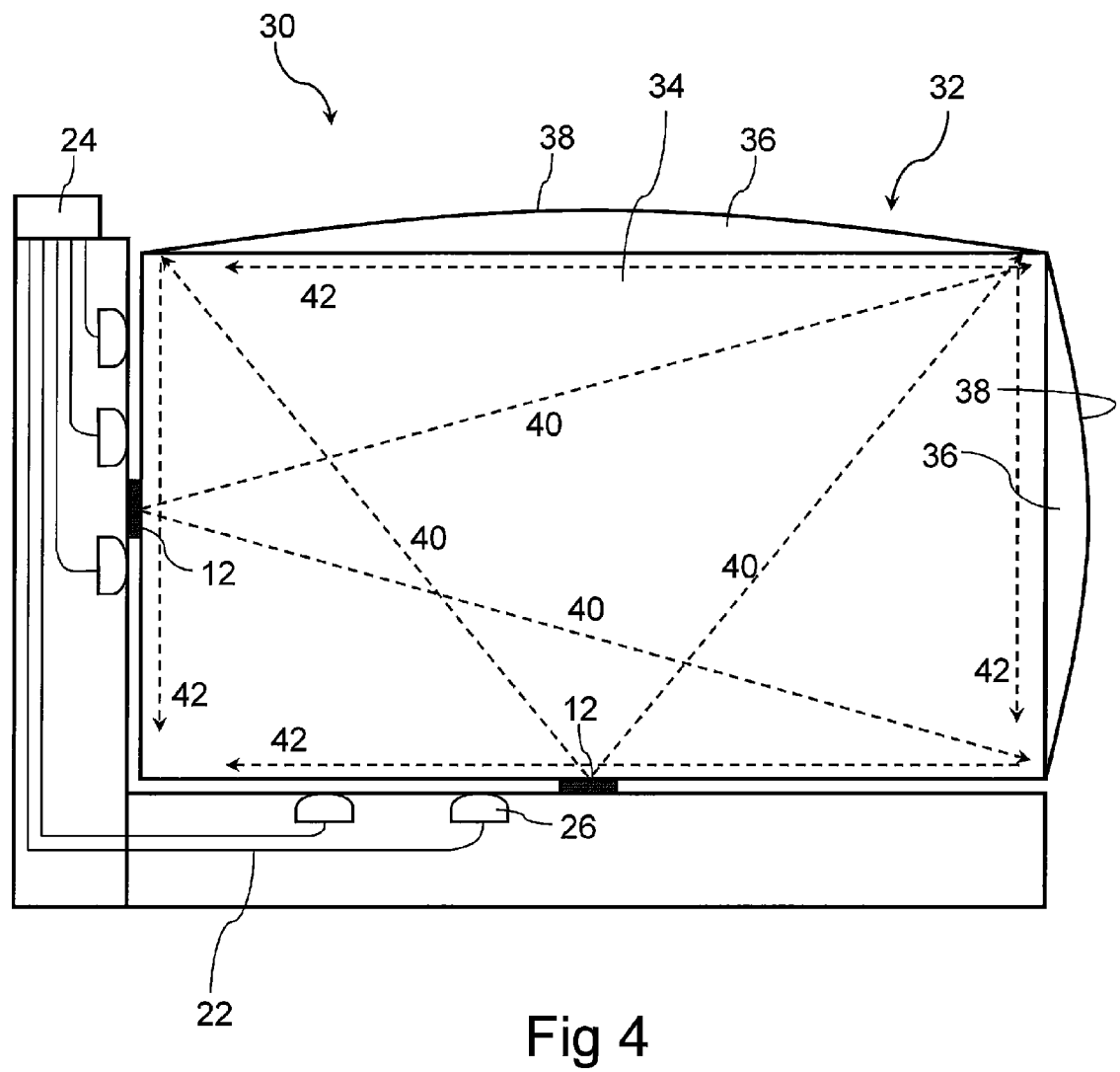
FIG. 4 illustrates a plan view of yet another type of 'infrared' touch input device.
Figure 5:
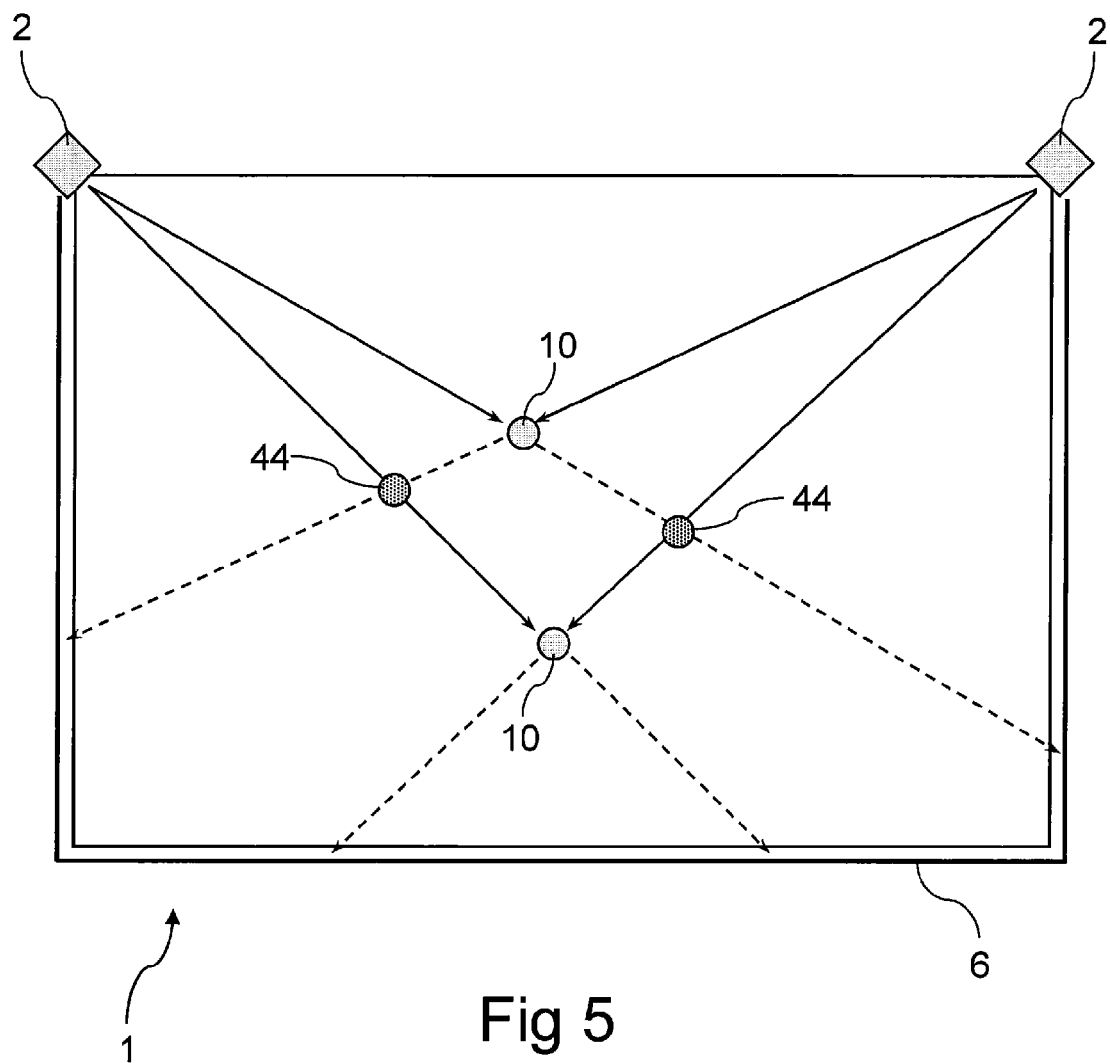
FIG. 5 illustrates a plan view of the 'optical' touch input device of FIG. 1 showing a double touch ambiguity.
Figure 8A:
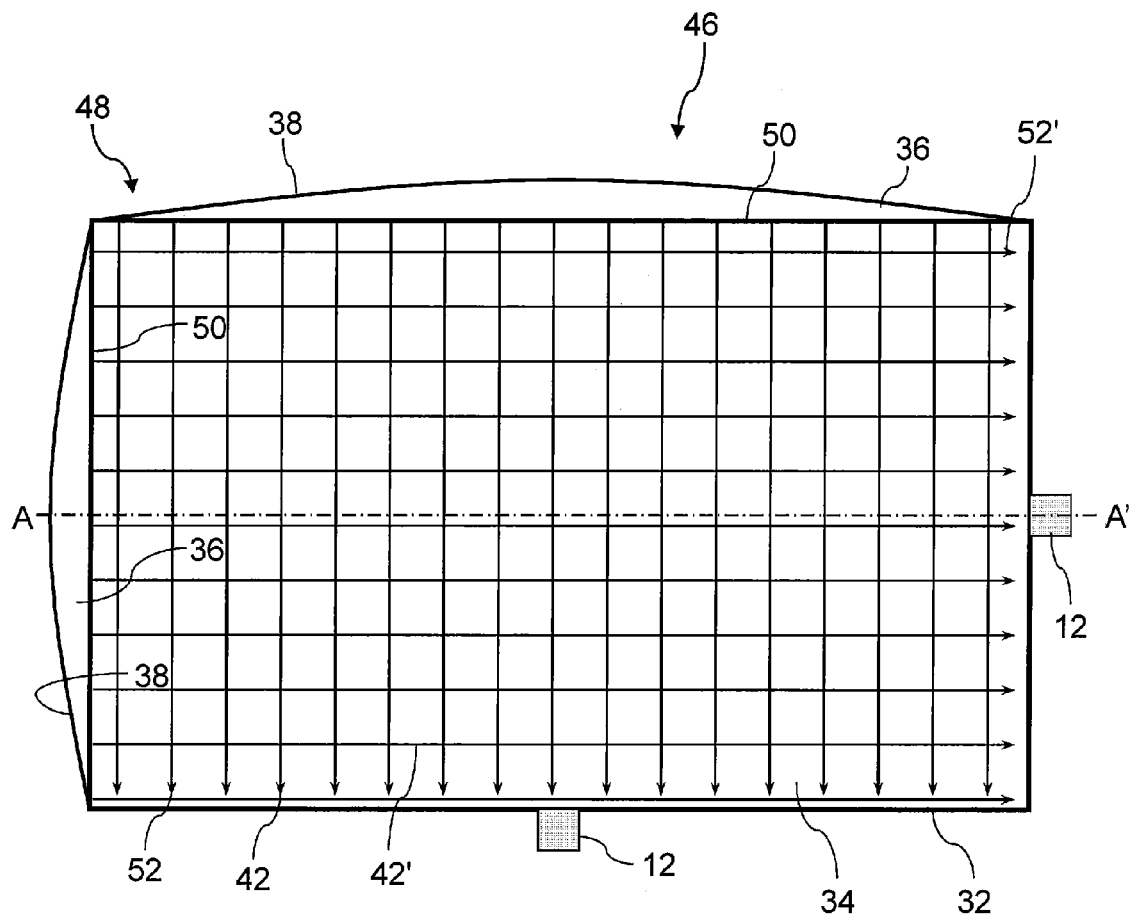
FIGS. 8A and 8B illustrate in plan view and cross-sectional side view a prior art projection system suitable for an infrared touch input device.
Figure 8B:
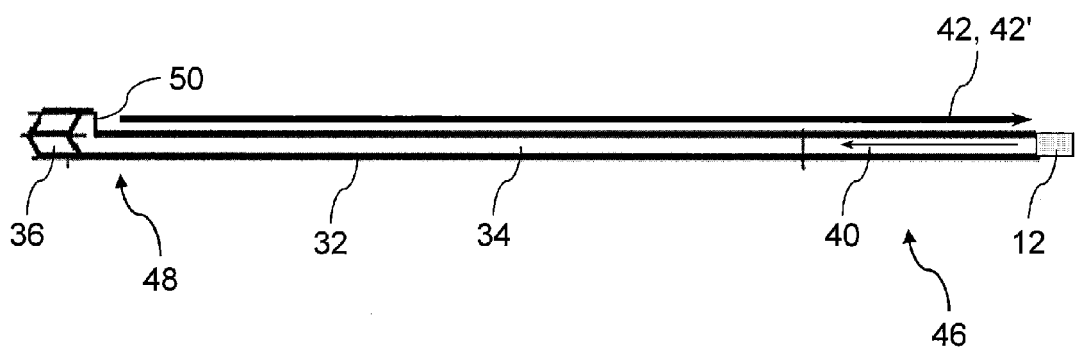

Referring to the drawings, FIG. 8A shows in plan view the projection system 46 of the 'infrared' touch input device illustrated in FIG. 4, and FIG. 8B shows a cross-sectional side view taken along the line A-A'. The projection system includes a light emitter 48 in the form of a transmissive body 32 including a transmissive element or light guide plate 34 and two collimation/redirection elements 36 that include parabolic reflectors 38. When this projection system is incorporated into a touch input device, the input area overlies the light guide plate. Infrared light 40 from two LEDs 12 is guided within the light guide plate and converted by the collimation/redirection elements into two sheets of light 42, 42' that are emitted from the exit facets 50, collimated in the plane of the light guide plate. This plane corresponds to the plane of the input area when the projections system is incorporated into a touch input device, and the terminology 'plane of the input area' will be used henceforth in this specification irrespective of whether a given projection system is incorporated into an input device. FIG. 8A shows several parallel light paths 52, 52' within each of the light sheets 42, 42'. The specific wavelength, or wavelength range, of the infrared light is unimportant, and will be chosen largely with regard to the availability of inexpensive sources of sufficient power. Infrared light in the vicinity of 850 nm has been found to be suitable.

Figure 1:
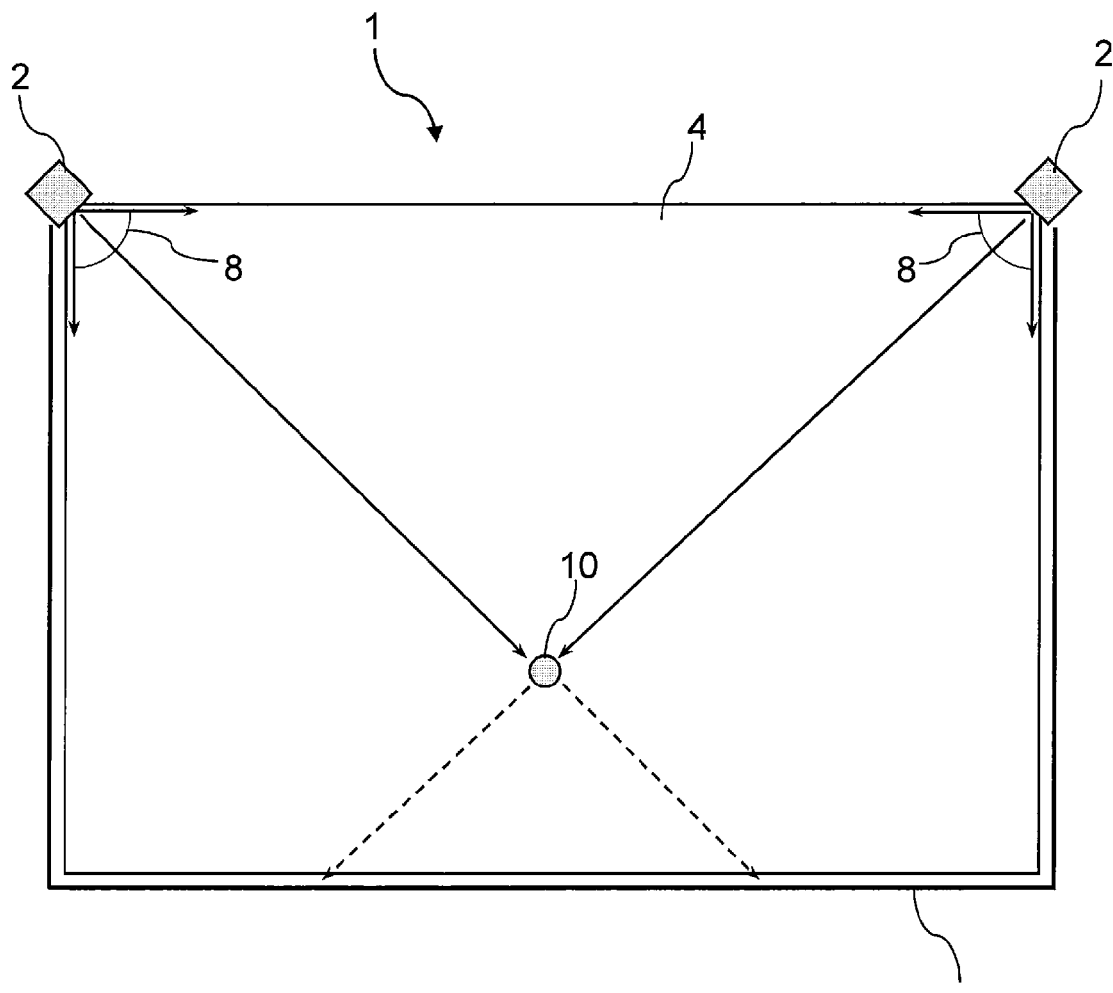
FIG. 1 illustrates a plan view of an 'optical' touch input device showing detection of a touch object.
Figure 2:
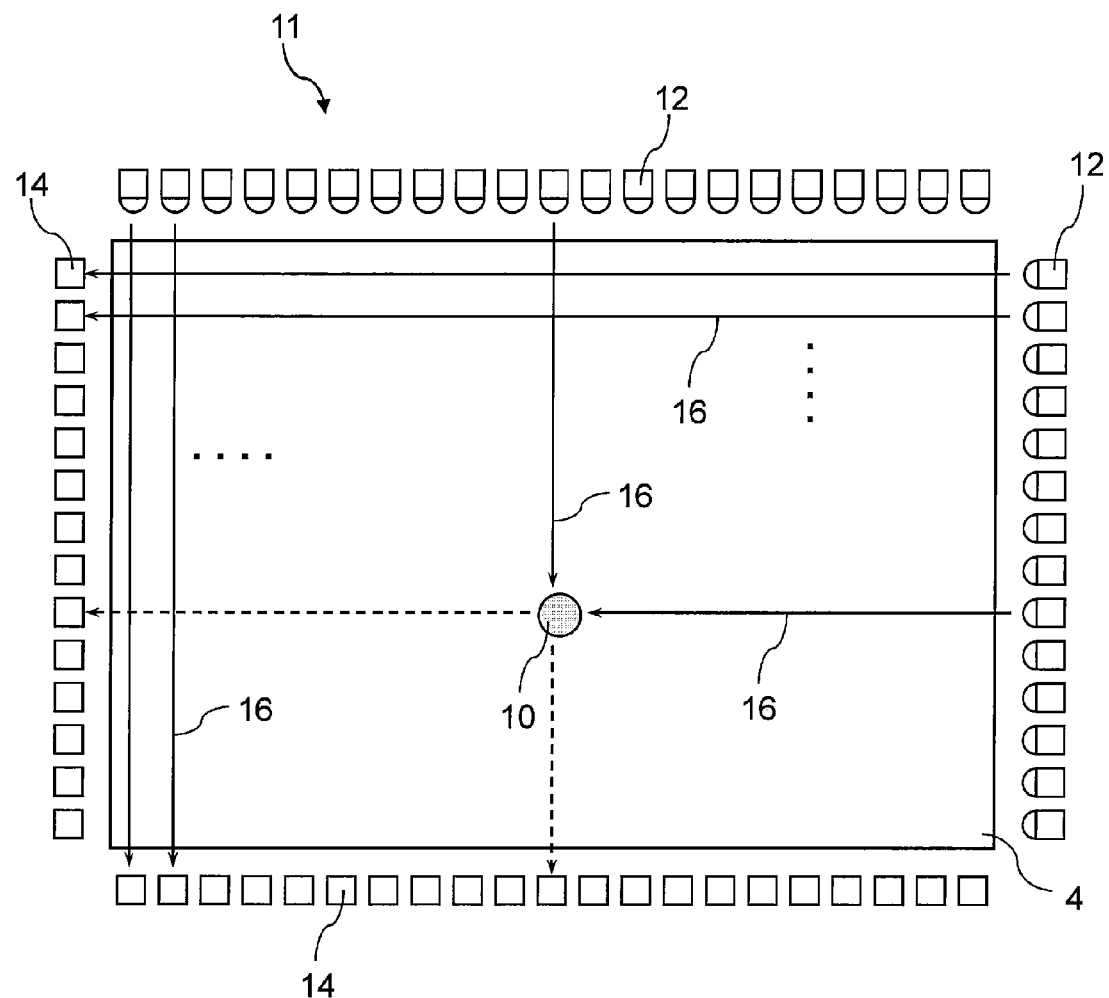
FIG. 2 illustrates a plan view of a conventional type of 'infrared' touch input device showing detection of a touch object.
Figure 3:
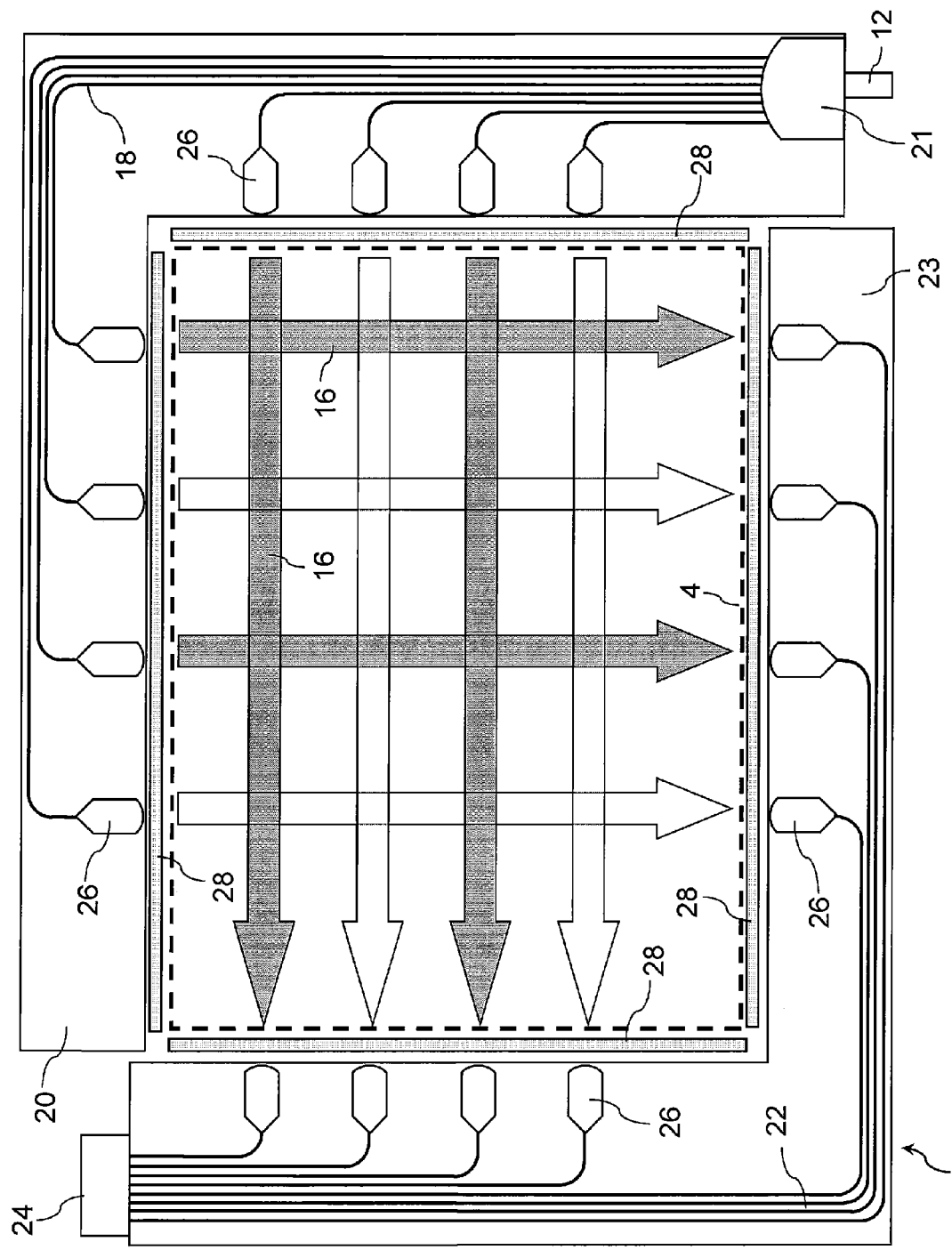
FIG. 3 illustrates a plan view of another type of 'infrared' touch input device.

In the particular embodiment shown in FIG. 8B the sheets of light 42, 42' are also collimated in the 'vertical' direction, i.e. the direction perpendicular to the plane of the input area, which may be achieved for example by an external vertical collimating lens 28 as shown in FIG. 3, or by cylindrical shaping of the exit facets 50. This 'vertical' collimation is not crucial for the working of a touch input device incorporating the projection system, but is instead a design choice. Referring to FIG. 4, it will be appreciated that a smaller amount of out-of-plane divergence can increase the amount of light entering the receive waveguides 22, improving the signal to noise ratio at the detector array 24, but makes the vertical positioning of the receive waveguides more critical.

Figure 9:
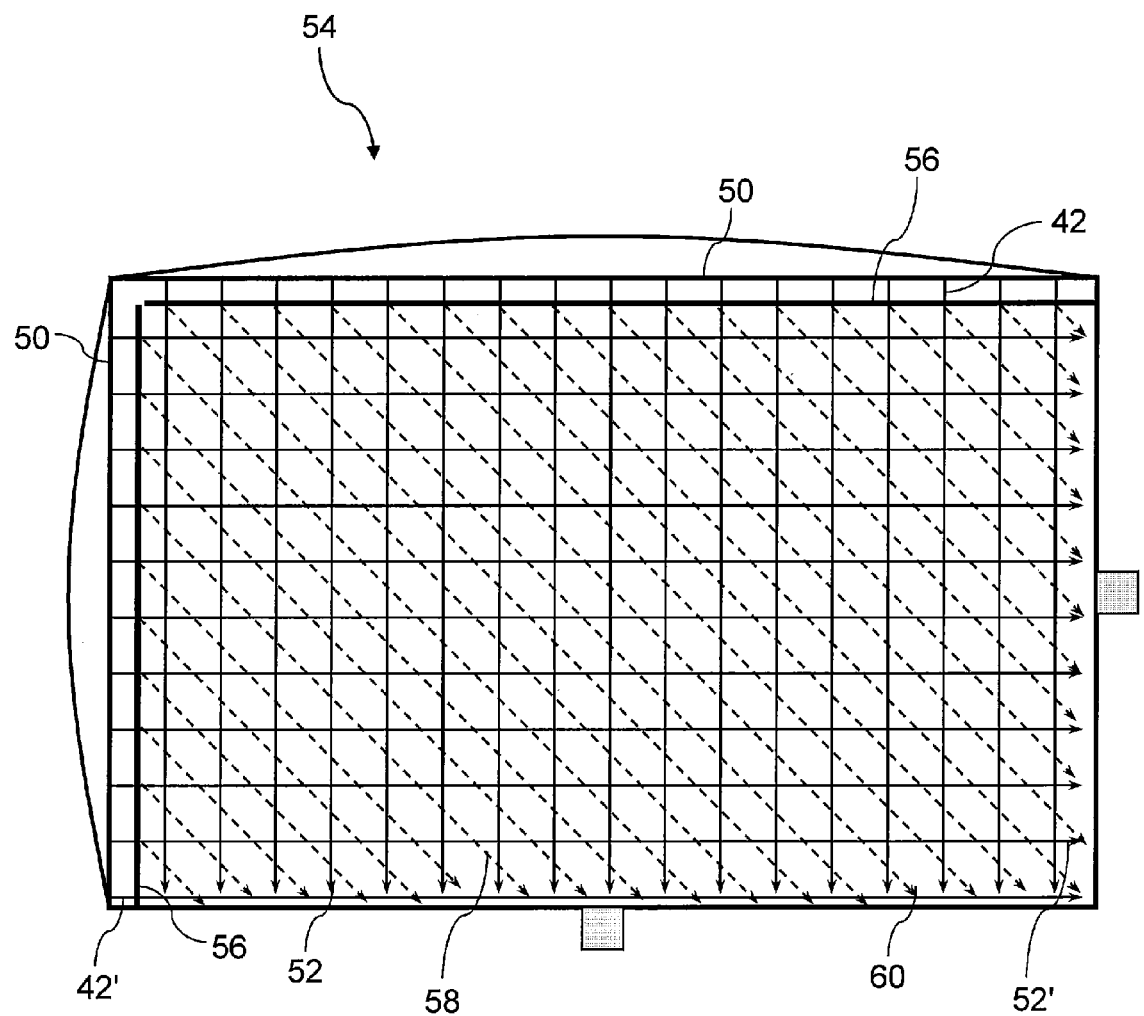
FIG. 9 illustrates in plan view a projection system according to a first embodiment of the present invention.

Turning now to FIG. 9, there is shown in plan view a projection system 54 according to a first embodiment of the present invention. This embodiment differs from the projection system 46 shown in FIG. 8A by the inclusion of an optical splitting element 56 in front of each exit facet 50 of the light emitter. These optical splitting element serves to 'tap off' a portion of each of the two 'primary' light sheets 42, 42' to produce an additional 'skew' light sheet 58 that propagates at 45° to the primary light sheets Importantly, because the primary light sheets are collimated in the plane of the input area when they are emitted from the exit facets, the skew light sheet will likewise be collimated provided the optical splitting element is designed with the appropriate regularity. Several parallel light paths 60 within the skew light sheet are shown in FIG. 9.

Figure 10:
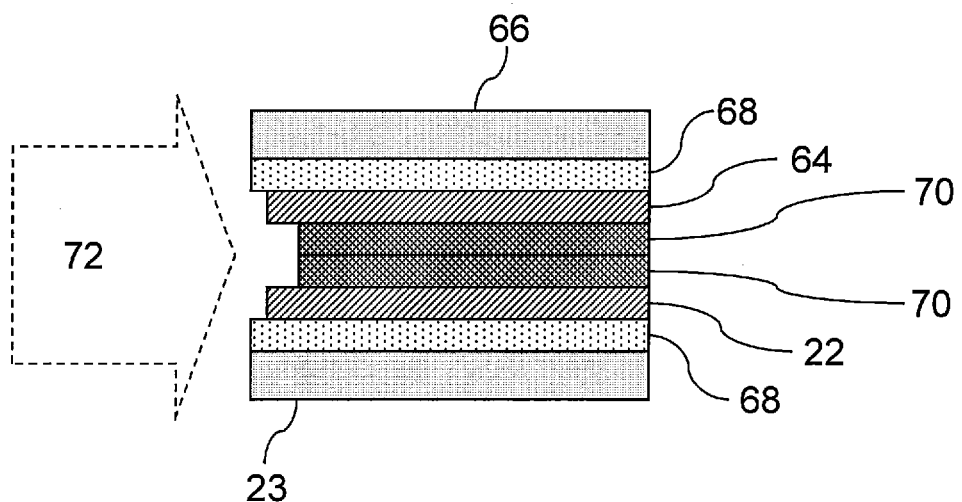
FIG. 10 illustrates in side view the stacking of waveguides on separate substrates.

Referring back to FIG. 4 for comparison, it will be appreciated that when the projection system 54 is incorporated into a touch input device 30, an additional 'skew' set of receive waveguides will be required, oriented to accept the light paths 60 within the skew light sheet. In one embodiment these additional waveguides are fabricated on the same substrate as the 'primary' receive waveguides, while in another embodiment they are fabricated on a separate substrate. Either way, the two waveguide arrays can be optically coupled to separate regions of a single detector array, or to separate detector arrays. The 'single substrate' possibility is simpler from a device assembly point of view, but the waveguide layout is more complex. The 'separate substrates' possibility requires the two waveguide arrays to be stacked, preferably 'waveguide to waveguide' with the respective substrates outermost for mechanical robustness. FIG. 10 illustrates such an arrangement in side view, with the 'primary' receive waveguides 22 and 'skew' receive waveguides 64 fabricated on separate substrates 23, 66 with optical isolation provided by lower cladding layers 68 and upper cladding layers 70. Since the two sets of receive waveguides will be spaced apart by no more than a few tens of micrometers, it is not difficult to ensure that the primary and skew light sheets, shown together in outline 72, have sufficient vertical divergence to be accepted by their respective sets of receive waveguides.

Details of suitable waveguide materials and patterning techniques can be found for example in US Patent Application Publication Nos US 2007/019033 A1, US 2007/0285406 A1 and US 2007/0258691 A1, and U.S. Pat. No. 7,738,746, the contents of which are incorporated herein by cross reference.

Figure 6:
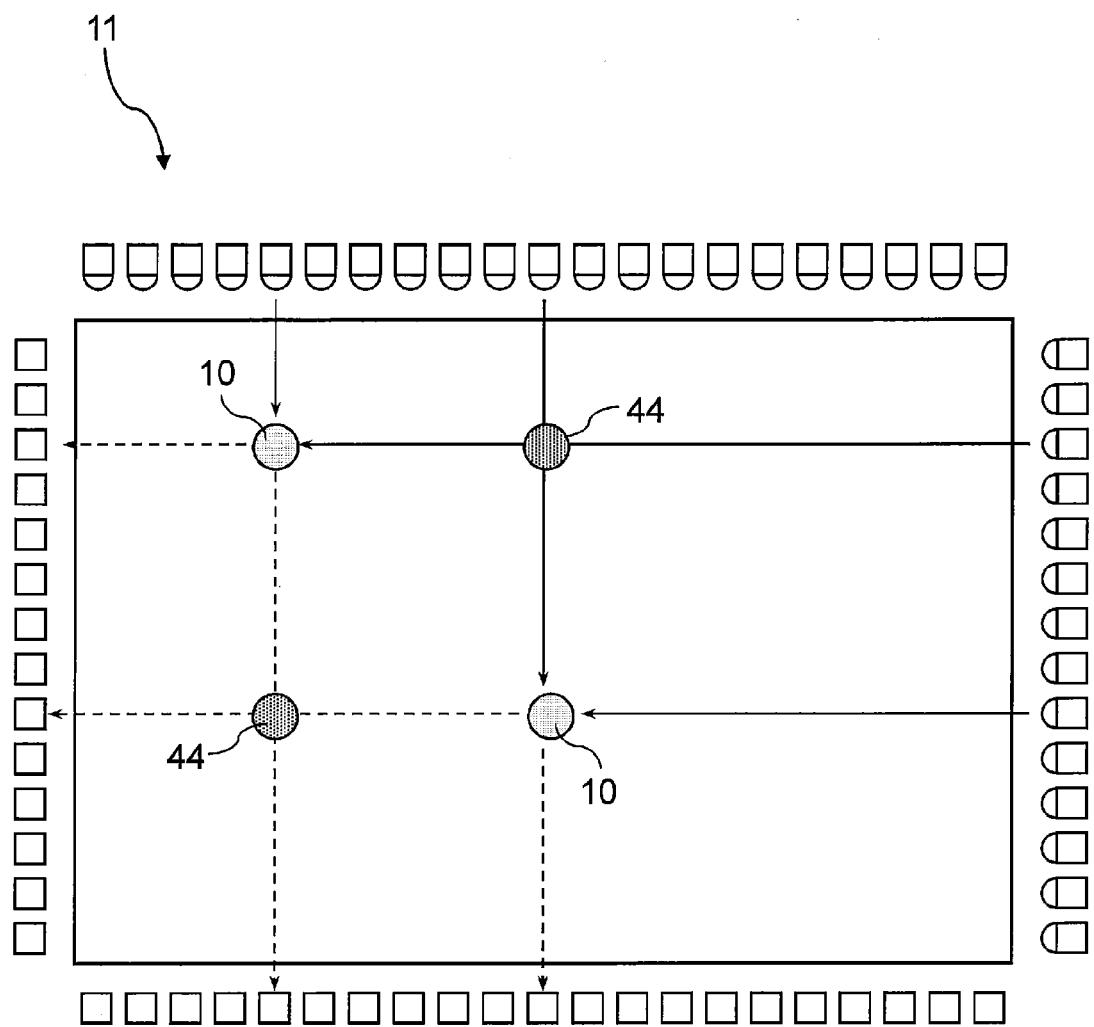
FIG. 6 illustrates a plan view of the infrared touch input device of FIG. 2 showing a double touch ambiguity.
Figure 7A:
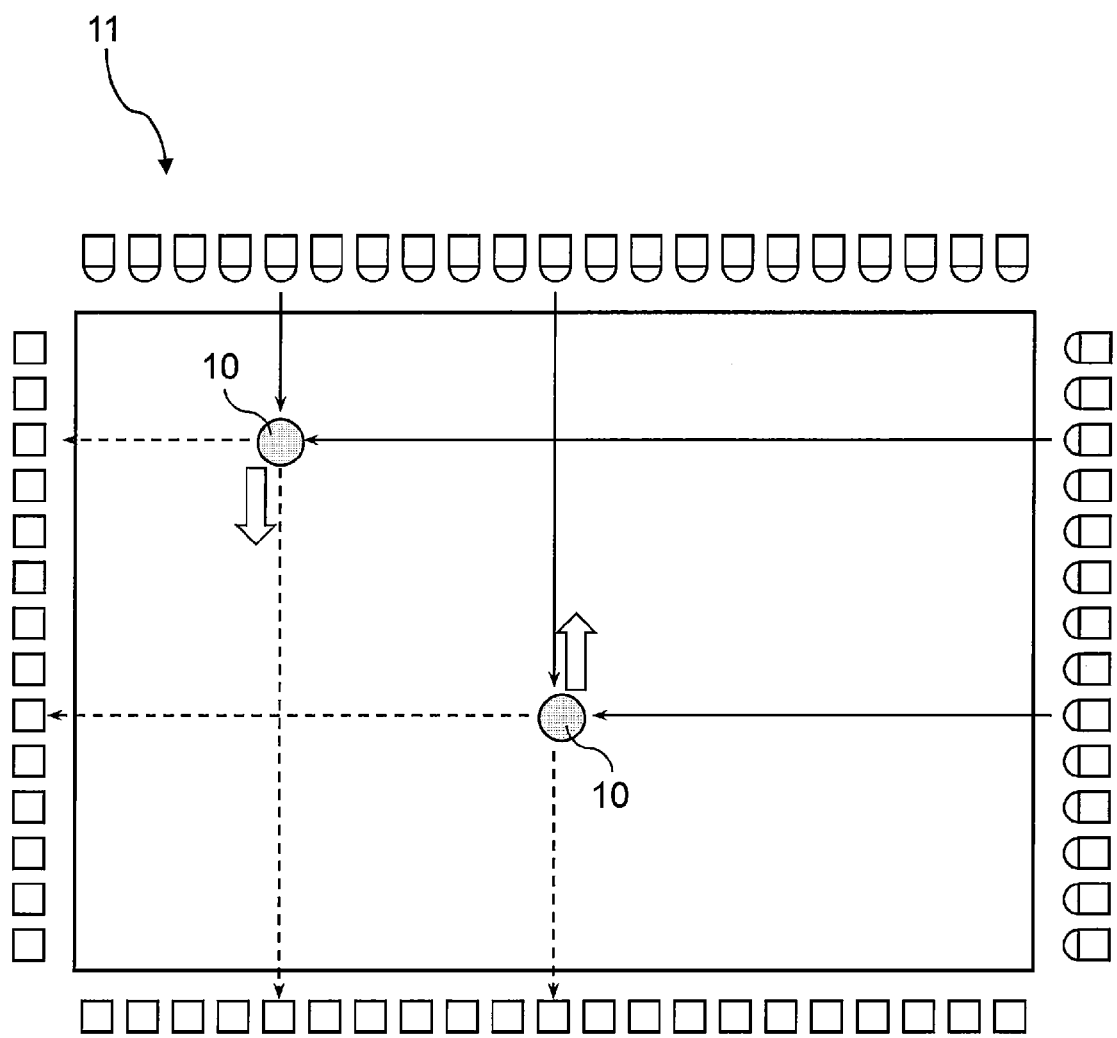
FIGS. 7A to 7D illustrate a plan view of the infrared touch input device of FIG. 2 showing recurrence of a double touch ambiguity with moving touch points.
Figure 7B:
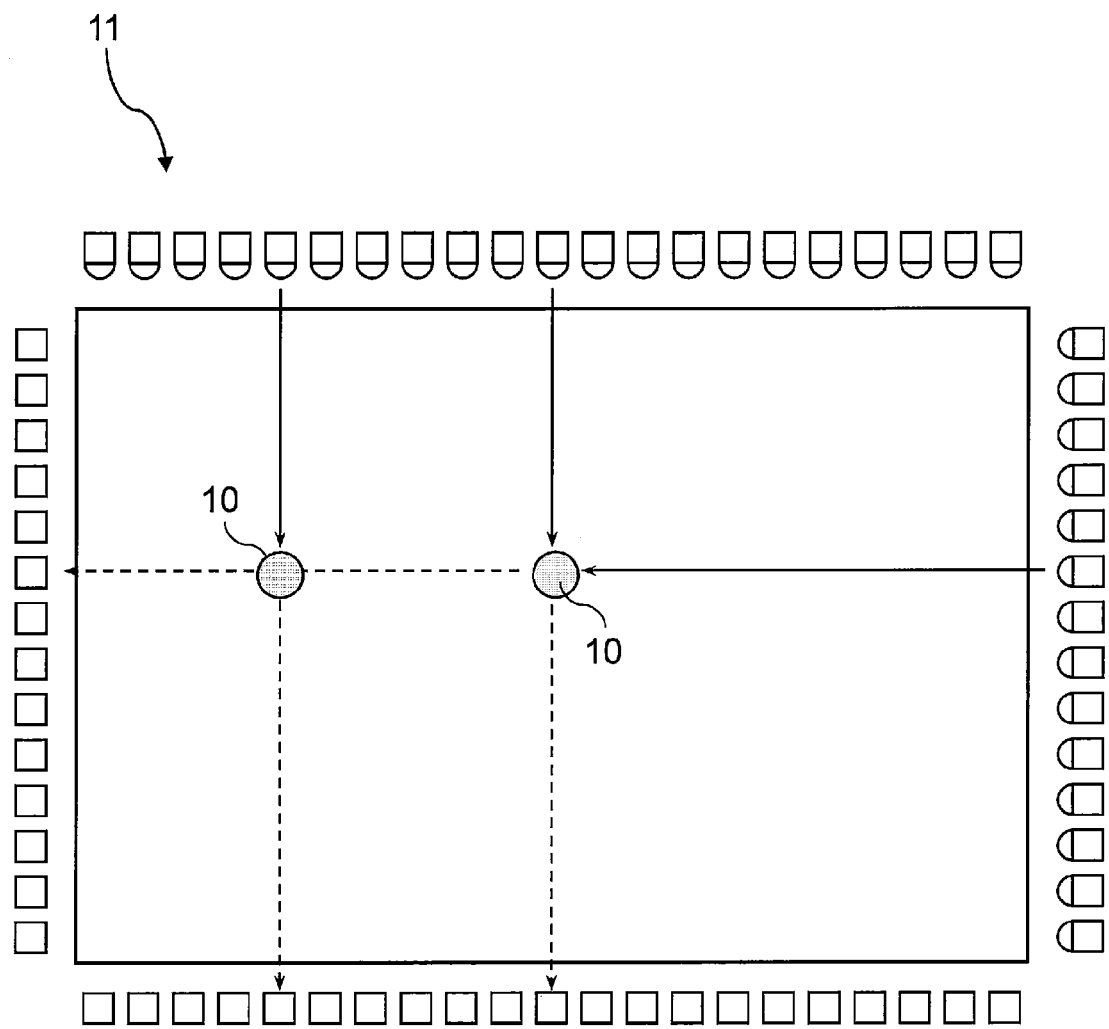
Figure 7C:
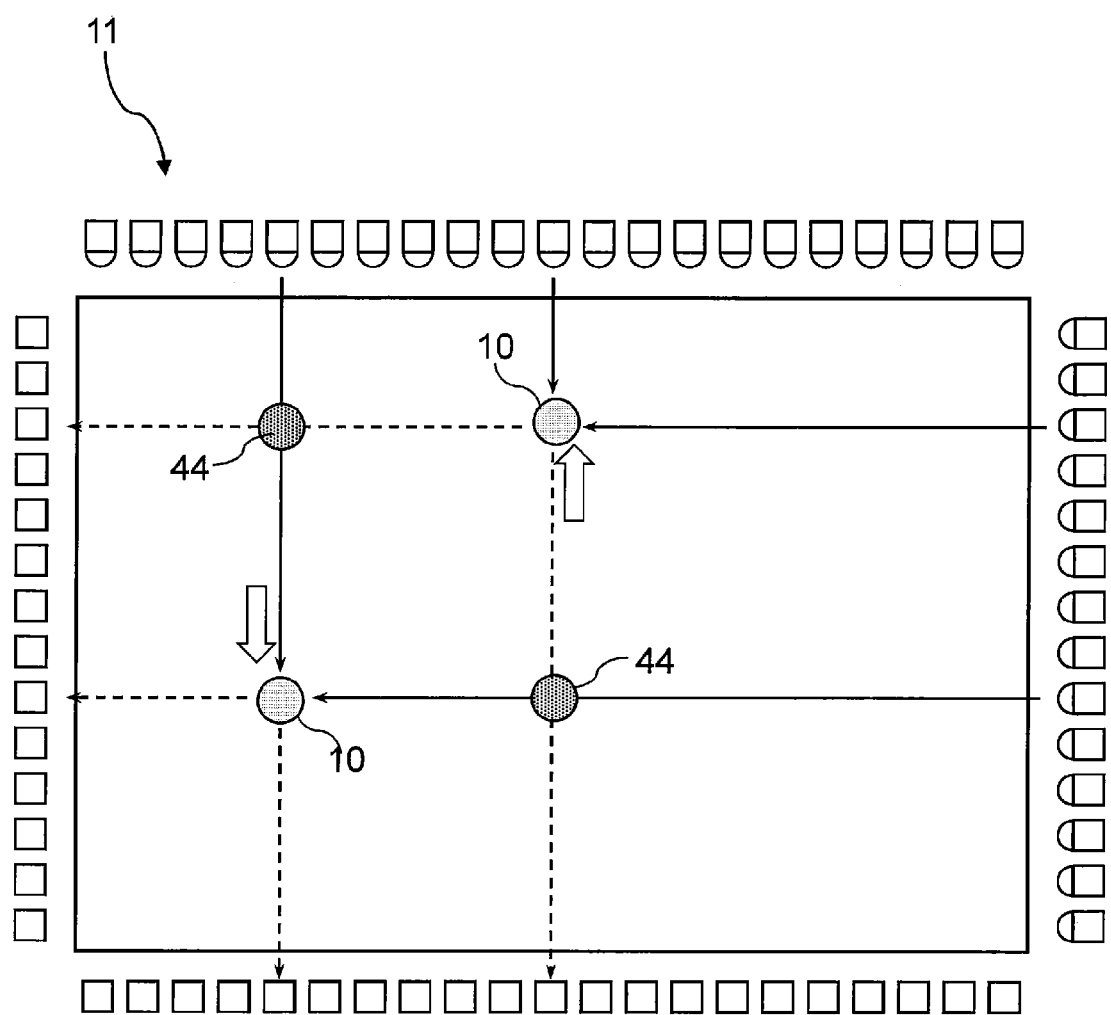
Figure 7D:
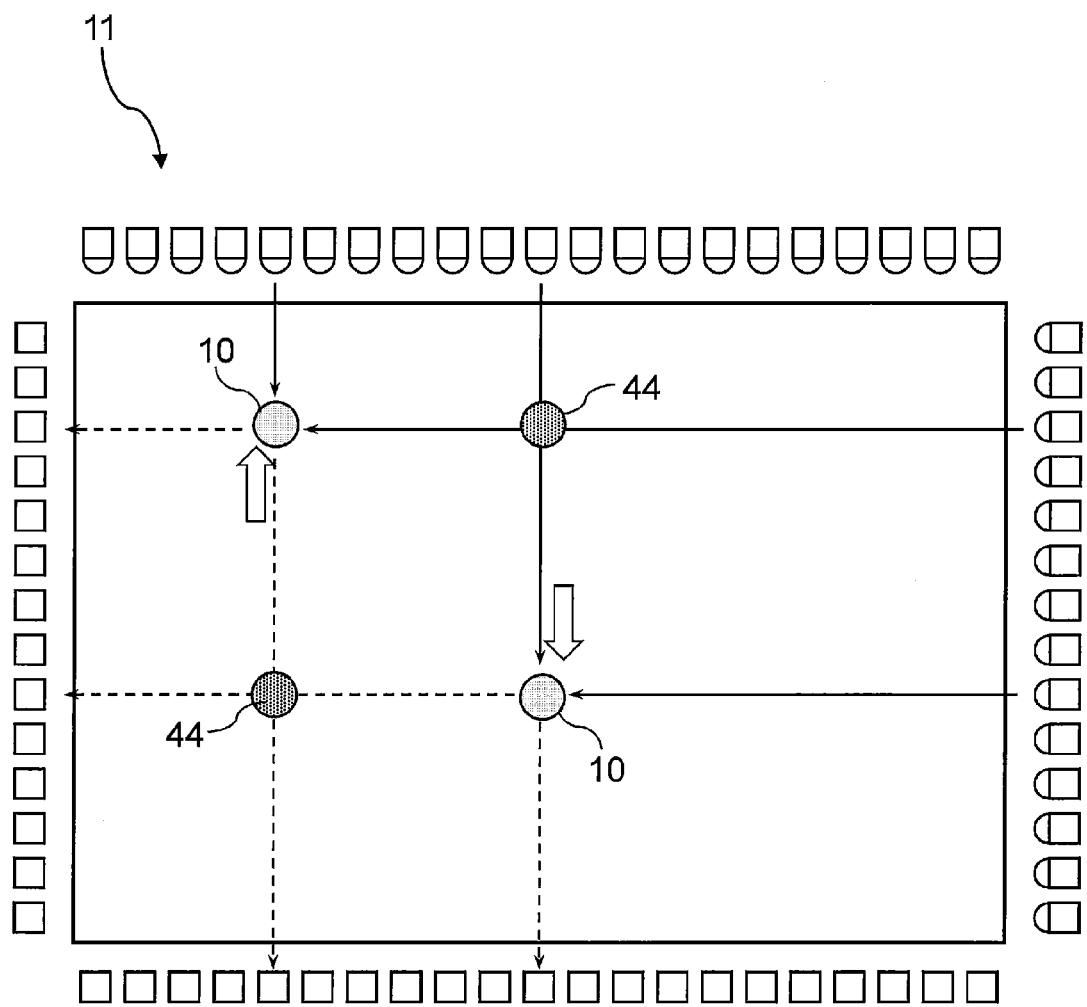
Figure 11:
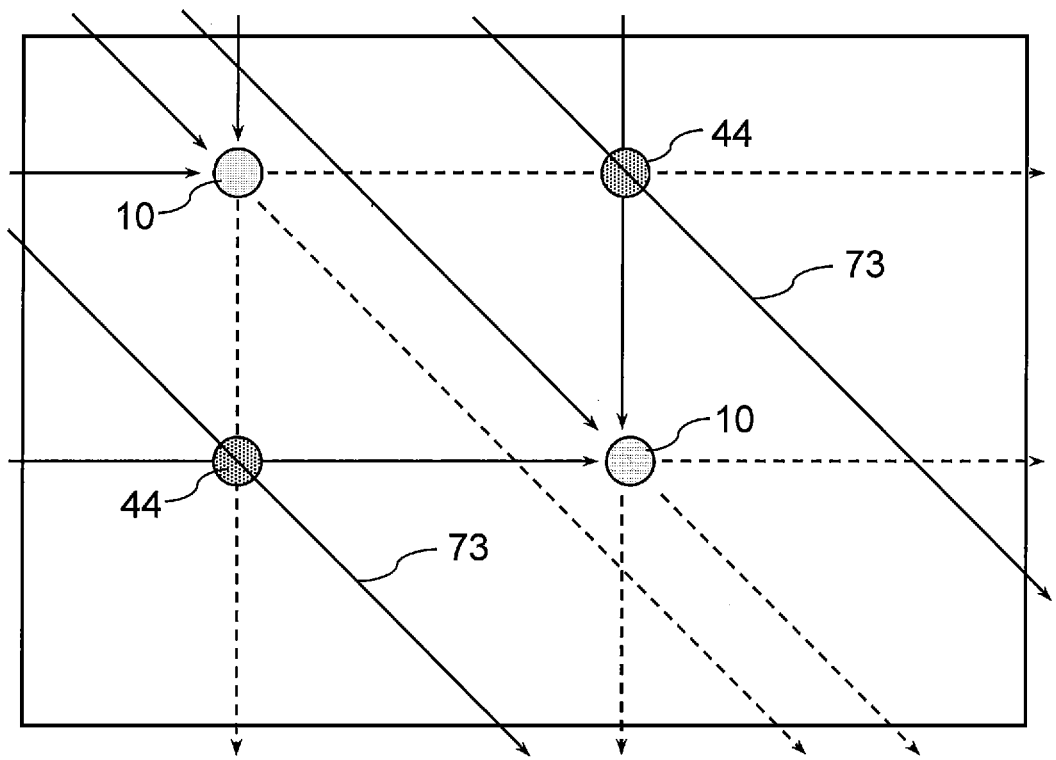
FIG. 11 shows how a double touch ambiguity is resolved by the provision of sensing beams in a third direction.

Turning now to FIG. 11, and in comparison with the situation shown in FIG. 6, it can be seen that when two touch objects 10 are simultaneously detected in the input area, the skew light paths 73 that pass through the 'phantom' points 44 allow those points to be discounted, thereby resolving the double touch ambiguity. Three sets of light paths will always be able to determine the location of two touch objects unambiguously and, more generally, n+1 sets of light paths can determine the location of n touch objects unambiguously. Although the configuration of light paths shown in FIG. 11 cannot always determine the location of three (or more) touch objects unambiguously, it can be shown that there are many instances in which it can do so, or at least eliminate several of the n(n−1) phantom points. In short, the multi-touch capability of the touch input device will be enhanced by the provision of the skew light paths generated by the inventive projection systems.

In preferred embodiments, the optical splitting element is in the form of a prism film, i.e. a strip of transparent material with a regular array of miniature prisms. Prism films are produced in large volume by companies such as 3M, typically in a roll-to-roll embossing process, primarily for use as 'brightness enhancement films' (BEFs) in displays. Although the particular prism films required for the present application will have a different design from commonly used BEFs, the same manufacturing technology can be used to mass produce suitable prism films once the required master has been fabricated.

Figure 12:
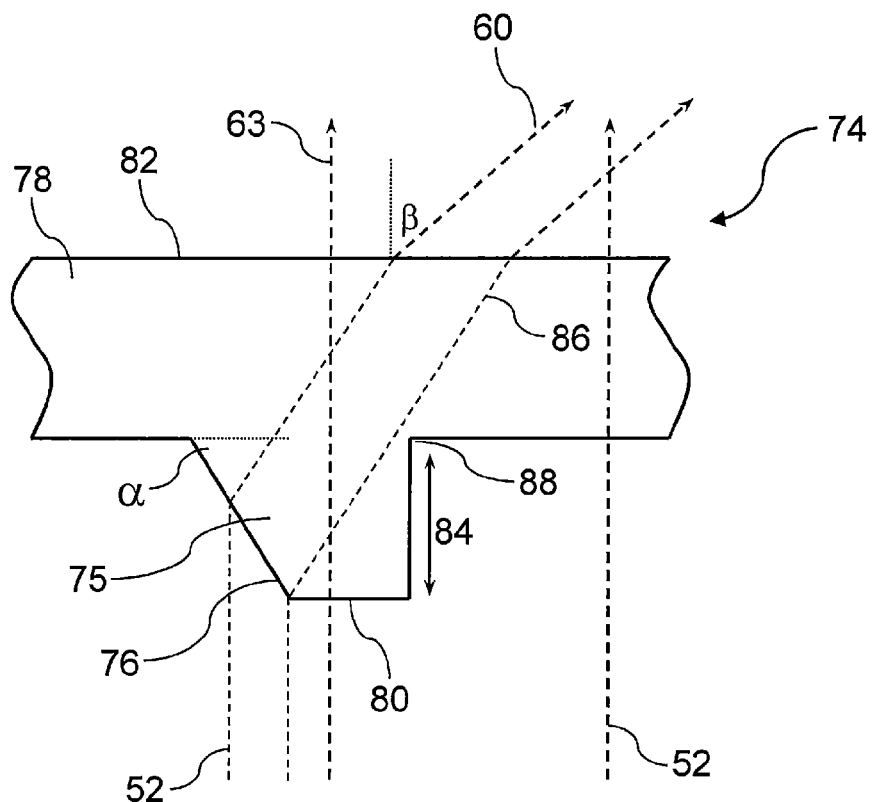
FIG. 12 illustrates a section of a prism film suitable for use as the optical splitting element in a projection system according to the first embodiment.

FIG. 12 shows a section of a prism film 74 according to a first embodiment, based around a truncated prism 75 with a first facet 76 at an angle α to the film base 78 and a second facet 80 parallel to the film base, facing a collimated sheet of light with beam paths 52 propagating perpendicularly to the film base. Those beam paths that encounter the second facet 80 or portions of the film base away from the truncated prism pass straight through to form the primary light paths 63, whereas those beam paths that encounter the first facet 76 are refracted firstly at that facet and again at the back surface 82 of the prism film to form the skew light paths 60. For a given depth 84 of the truncated prism, the second facet 80 should be at least wide enough for the 'perimeter' beam path 86 to miss the corner 88. A benefit of the truncated prism shape is that there are no sharp protruding corners that could be easily damaged. Application of Snell's Law and elementary trigonometry shows that the prism angle α and the angle of transmission β are related by the equation $$\alpha = \arcsin\left(\frac{n_1 \cdot \sin\alpha}{n_2}\right) + \arcsin\left(\frac{n_3 \cdot \sin\beta}{n_2}\right) \quad (1)$$

where $n_1$, $n_2$ and $n_3$ are the refractive indices of the incidence side medium, the prism film material and the transmission side medium respectively. By way of example, we will consider the situation where the sensing light has wavelength around 850 nm and the prism film is composed of a polycarbonate with refractive index 1.545 at 850 nm To obtain a transmission angle of β=45° for example, and assuming the incidence and transmission side media are air ($n_1$=$n_3$~1), equation (1) is satisfied for a prism angle α=62.1°.

Turning now to FIG. 13A, there is shown a section of a prism film 74 with several truncated prisms 75 on a pitch 90. In this particular case the prisms are widely spaced, so that the angled facets 76 'tap off' only a minor portion of the incident light sheet. In the context of a touch input device, this sort of configuration directs most of the signal power into the 'primary' beam paths, largely preserving the dynamic range of the system used to sense and locate touch objects. This may be a desirable situation if, for example, double touch capability is not routinely required. Even if double touch capability is routinely required, the skew beams only need to detect the touch objects rather than locate them with precision, a task performed by the primary light sheets and detection optics. FIG. 13B shows an alternative configuration of a prism film where the truncated prisms 75 are close-packed; in this case only those light paths striking the facets 80 pass through without deflection, resulting in a more equal splitting of the incident light.

Figure 14:
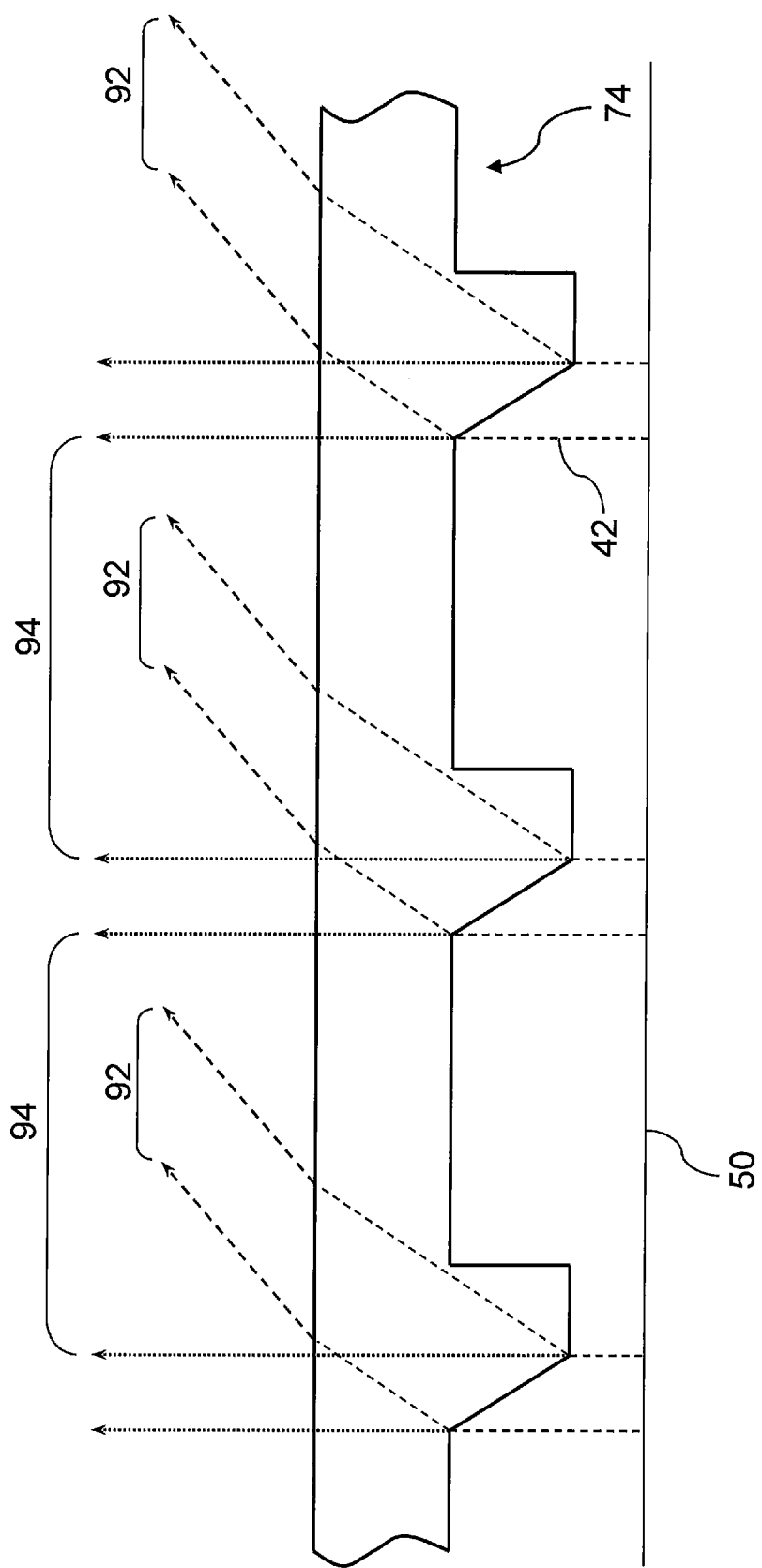
FIG. 14 shows how the design of a prism film as shown in FIG. 13A determines the width of the resulting beams.

Turning now to FIG. 14, it can be seen that when a prism film 74 is placed into a collimated sheet of light 42 emanating from the exit facet 50 of a light emitter, the sheet of light is split into two sets of discrete beams 92, 94. When the projection system is incorporated into an infrared touch input device, these beams will propagate across the input area towards the respective arrays of receive waveguides with their in-plane lenses. In the context of a touch input device, for spatial resolution purposes it is preferable for each set of discrete beams to resemble an unbroken sheet of light as closely as possible. Practically, this means that each in-plane lens should receive several discrete beams. For example if the in-plane lenses are of order 1 mm wide, the prism film is preferably designed such that the width and/or spacing of the beams 92, 94 is of order 0.2 mm. It will be appreciated that the prism film 74 can be designed to produce primary light paths and skew light paths with a wide range of widths, to suit the application. The widths of the straight and skew light paths can be different widths or the same, and may for example be in the range 0.05 to 5 mm.

Figure 15:
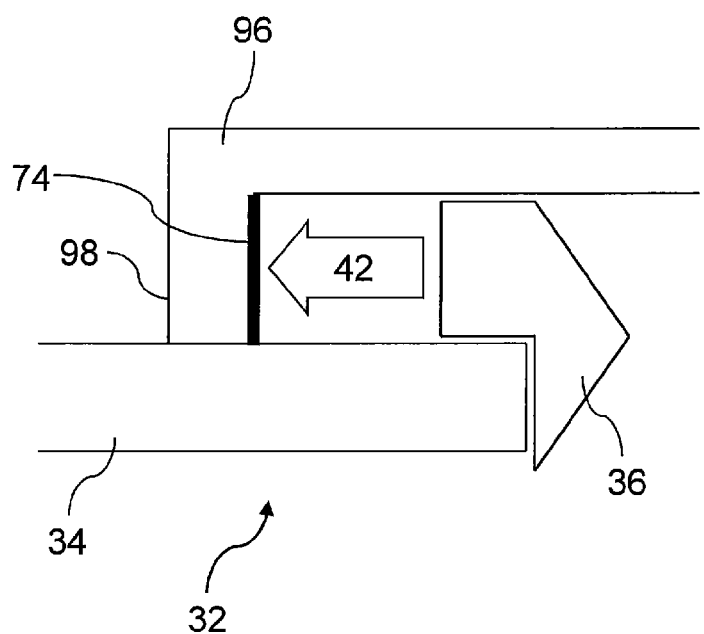
FIG. 15 illustrates how a prism film of the type shown in FIGS. 13A, 13B and 14 can be incorporated into a projection system according to the first embodiment.

FIG. 15 shows in side view a configuration incorporating a prism film 74, as shown in FIGS. 13A, 13B and 14 for example, into a touch input device. The prism film is adhered (e.g. by a UV-cured optical adhesive) to the interior surface of a bezel protector 96 that would in any event be present, and is thereby placed in the path of the collimated light sheet 42 emitted from a light emitter comprising a transmissive body 32. In comparison with FIG. 12, it can be seen that the exterior surface 98 of the bezel protector replaces the prism film back surface 82 as the interface where the deflected beams are refracted a second time. The prism film and bezel protector will preferably have similar or identical refractive indices to minimise reflection loss at the interface, but a refractive index differential between the two will not affect the outgoing beam directions. FIG. 15 also shows an alternative embodiment of the transmissive body 32, where the transmissive element/light guide plate 34 and the collimation/redirection element 36 are manufactured separately before being combined. As described in the above-mentioned US Patent Application Publication No 2008/0278460 A1, it is also possible for the transmissive body to be composed of separate transmissive, collimation and redirection elements, or for there to be separate transmissive bodies for each axis, stacked on top of each other, each comprising a transmissive element, a collimation element and a redirection element.

Figure 16:
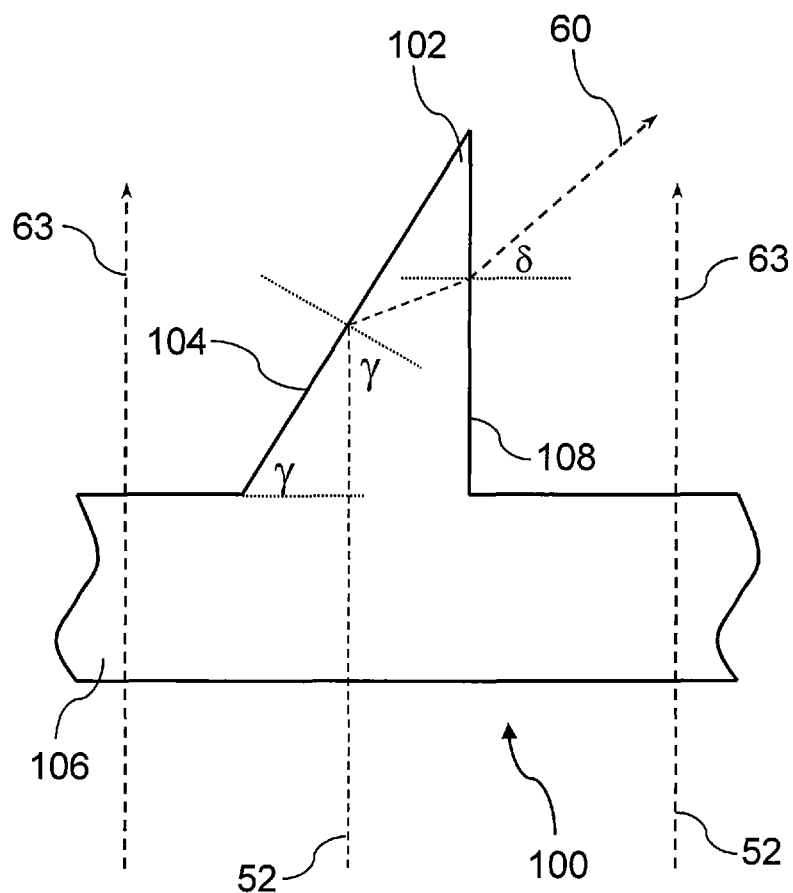
FIG. 16 illustrates a section of another prism film suitable for use as the optical splitting element in a projection system according to the first embodiment.

FIG. 16 shows a section of a prism film 100 according to a second embodiment, based around a prism 102 with a facet 104 at an angle γ to the film base 106, facing a collimated sheet of light with beam paths 52 propagating perpendicularly to the film base. Those beam paths that encounter portions of the film base away from the prism pass straight through to form the primary light paths 63, whereas those beam paths that encounter the angled facet 104 are reflected towards the facet 108 where they are refracted to form the skew light paths 60. Application of Snell's Law and elementary trigonometry shows that the prism angle γ and the angle of deflection δ are related by the equation $$n_3 \cdot \sin\delta = n_2 \cdot \sin(2\gamma - 90) \quad (2)$$

where $n_2$ and $n_3$ are the refractive indices of the prism film material and the transmission side medium respectively, and γ and δ are in degrees. To obtain a deflection angle of δ=45° for example, and assuming the transmission side medium is air ($n_3$~1) and the prism film composed of a polycarbonate with $n_2$=1.545 at 850 nm, equation (2) is satisfied for a prism angle γ=58.6°. The critical angle $\theta_c$ for reflection at the angled facet 104 is given by $\theta_c = \arcsin(n_2/n_3)$, so that $\theta_c$=40.3° if $n_2$=1.545 and $n_3$=1. For an incident beam path 52 propagating perpendicularly to the film base 106, the angle of incidence at the facet 104 is equal to the prism angle γ, which in this example is greater than $\theta_c$, so that total internal reflection occurs.

Figure 17:
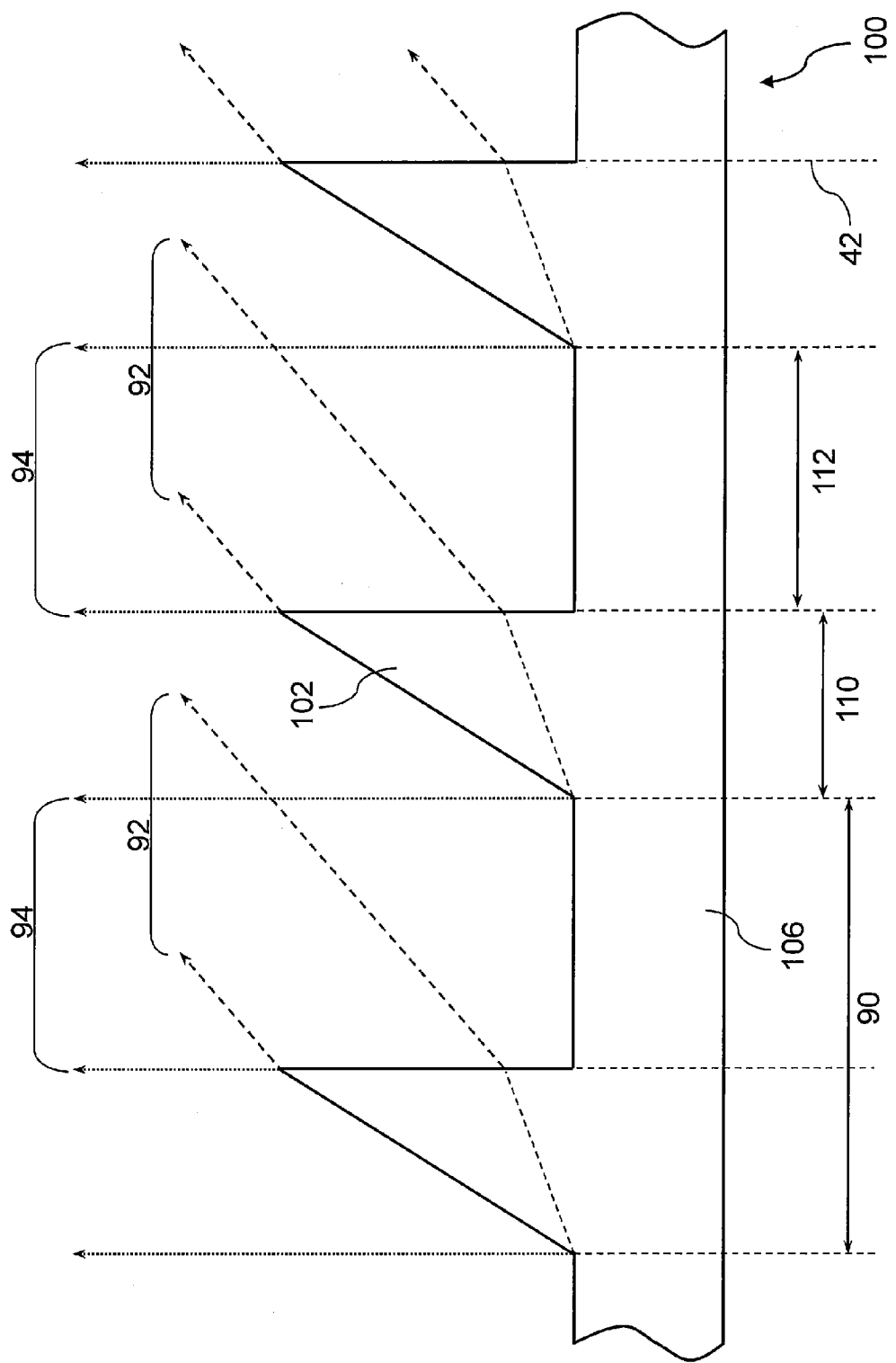
FIG. 17 shows how the design of a prism film as shown in FIG. 16 determines the width of the resulting beams.

Turning now to FIG. 17, there is shown a section of a prism film 100 with several prisms 102 on a pitch 90. In this case the splitting of the incident light sheet 42 into skew beams 92 and primary beams 94 depends on the relative widths 110, 112 of the prisms and the gaps between them, and as for the prism film 74 of the first embodiment, it's preferable for the prism film 102 to be designed such that each in-plane lens receives several discrete beams.

Figure 18:
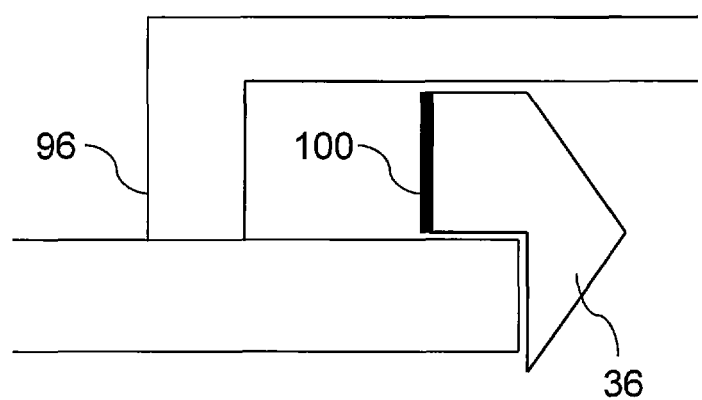
FIG. 18 illustrates how a prism film of the type shown in FIG. 17 can be incorporated into a projection system according to the first embodiment.

FIG. 18 shows in side view a configuration incorporating a prism film 100 into a touch input device. In this configuration the prism film is adhered (e.g. by a UV-cured optical adhesive) to the exit facet of the collimation/redirection element 36, and protected from the environment by the bezel protector 96.

Whatever the details of the prism design, it will be appreciated that prism films can be conveniently produced in sheet form by known techniques such as a roll-to-roll embossing process, then cut into linear strips for incorporation into projection systems for touch input devices as shown in FIG. 15 or 18 for example.

Figure 19:
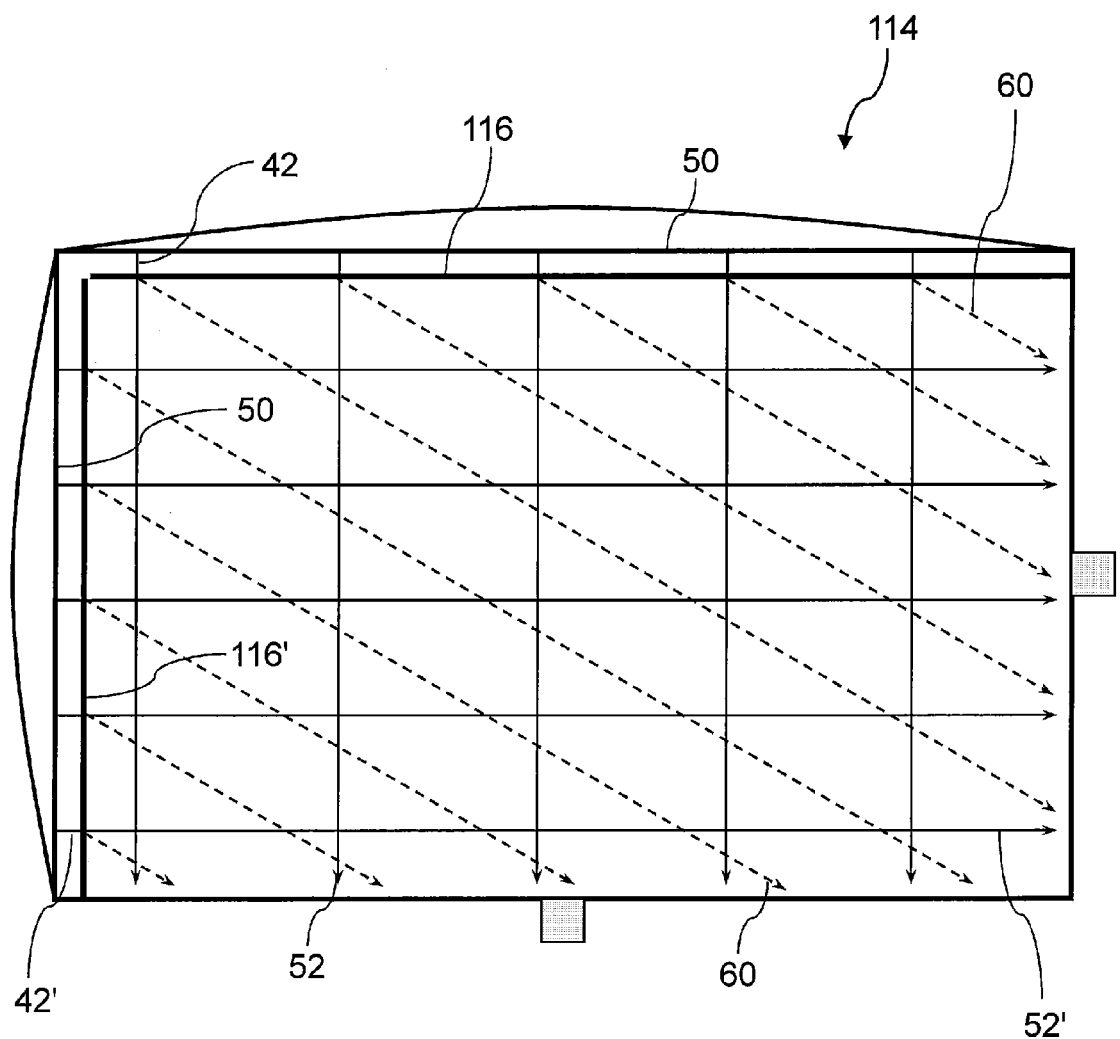
FIG. 19 illustrates in plan view a projection system according to a second embodiment of the present invention.

Although the above embodiments show skew beams propagating at 45° to the primary beams, inspection of FIG. 11 shows that a double touch ambiguity can also be resolved by skew beams propagating at other angles, provided they are inclined at a sufficient angle to both primary beam directions. By way of example, FIG. 19 shows in plan view of a projection system 114 according to a second embodiment of the present invention, where the skew beams 60 propagate at 60° to one set of primary light paths 52 and at 30° to the other set of primary light paths 52'. This embodiment requires two different optical splitting elements 116 and 116', adding to the Bill of Materials, but still serves to improve the multi-touch capability of an infrared touch input device.

Figure 29:
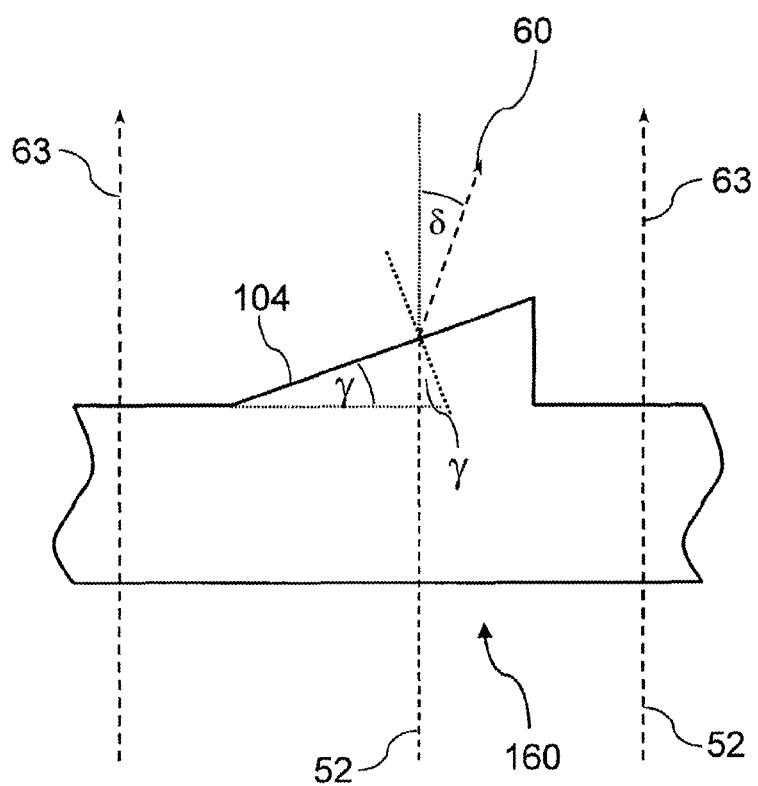
FIG. 29 illustrates a section of another prism film suitable for use as an optical splitting element.

FIG. 29 shows in plan view a section of a prism film 160 that is a variation of the prism film 100 shown in FIGS. 16 and 17. In this case the prism angle γ is chosen such that the beam paths 52 encounter the facet 104 at less than the critical angle and refracted to form the skew light paths 60. In this case the prism angle γ and the deflection angle δ are related by the equation $$n_3 \cdot \sin(\delta+\gamma) = n_2 \cdot \sin\gamma \quad (3)$$

where $n_2$ and $n_3$ are the refractive indices of the prism film material and the transmission side medium respectively. Those skilled in the art will understand that a fraction of the incident light will also be internally reflected at the facet 104 and lost to the system, and that this fraction gets larger as the angle of incidence approaches the critical angle. Consequently this prism design is better suited for generating skew beams with relatively small deflection angles δ, as illustrated in FIG. 29. By way of example, assuming the transmission side medium is air ($n_3 \sim 1$) and the prism film composed of a polycarbonate with $n_2=1.545$ at 850 nm, a prism angle γ=24.1° will give a deflection angle of δ=15°.

Figure 20:
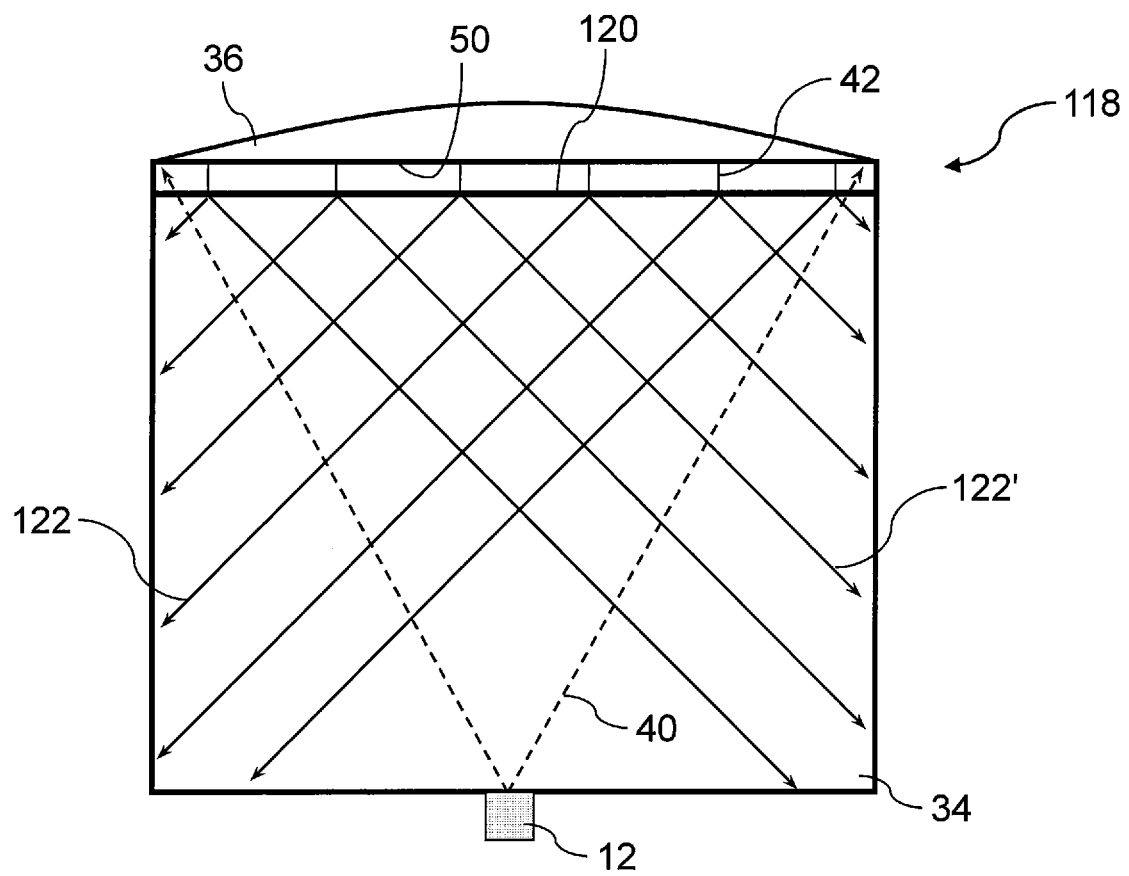
FIG. 20 illustrates in plan view a projection system according to a third embodiment of the present invention.

Turning now to FIG. 20, there is shown in plan view a projection system 118 according to a third embodiment of the present invention. In this embodiment IR light 40 is launched from an LED 12 into a planar transmissive element/light guide plate 34 within which it diverges in-plane towards a collimation/redirection element 36. This collimation/redirection element converts the light into an in-plane collimated sheet of light 42 emitted from the output facet 50. An optical splitting element 120 splits this light sheet into two sets of parallel light beams 122, 122' that propagate in first and second directions above the planar transmissive element/light guide plate. In the particular embodiment illustrated, the first and second directions are perpendicular to each other, and both are at 45° to the longitudinal axis of the optical splitting element.

Figure 21:
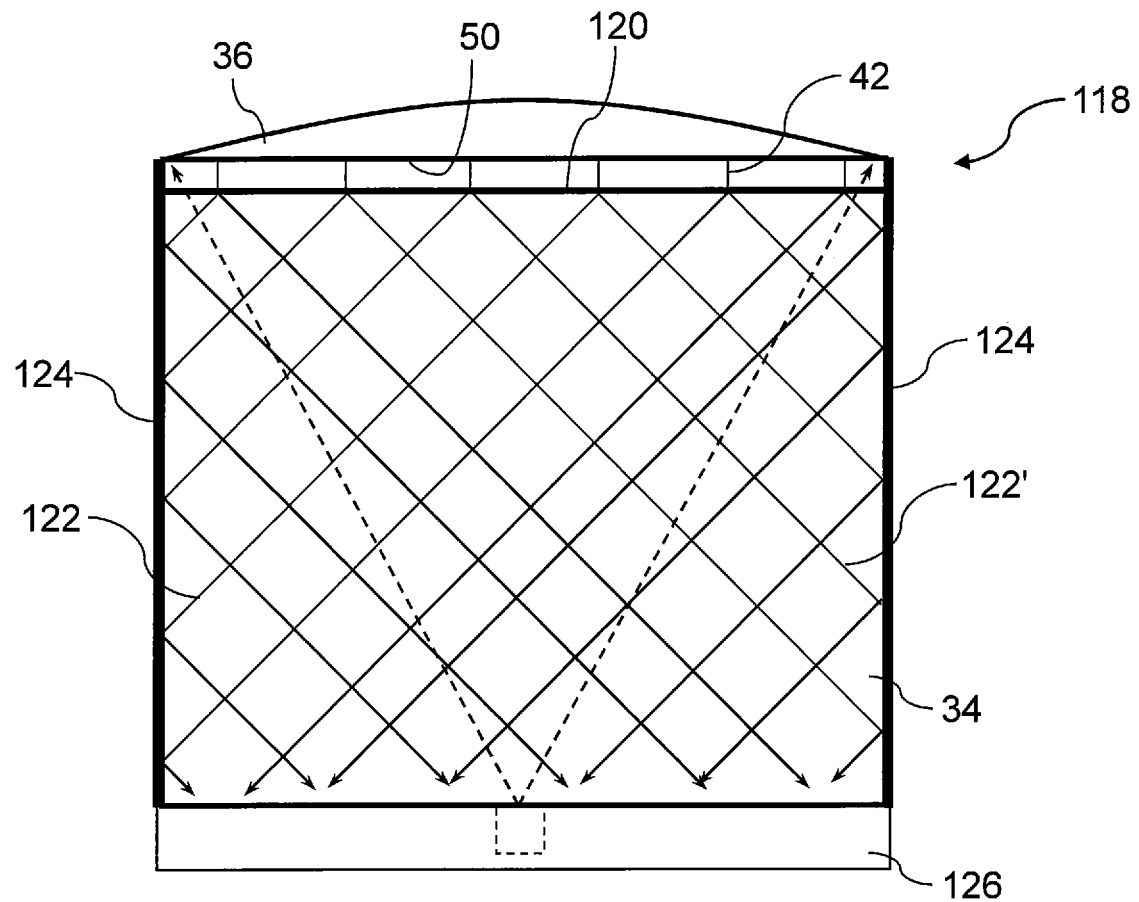
FIG. 21 illustrates in plan view how the projection system shown in FIG. 20 can be incorporated into a touch input device.

As shown in plan view in FIG. 21, the projection system 118 can be incorporated into an infrared touch input device with the aid of a pair of plane mirrors 124 that fold the light beams 122, 122' to form a Cartesian beam grid in front of the transmissive element/light guide plate 34. The beams propagate towards a receive system 126 that includes appropriately angled receive waveguides on a single substrate or on two stacked substrates as described previously. An advantage of this touch input device configuration compared to one incorporating the projection system 54 shown in FIG. 9 is significantly reduced bezel width along the sides occupied by the plane mirrors. However it will be appreciated that because the projection system 118 only produces two sets of parallel light paths, it will not resolve a double touch ambiguity when incorporated into a touch input device.

Figure 22:
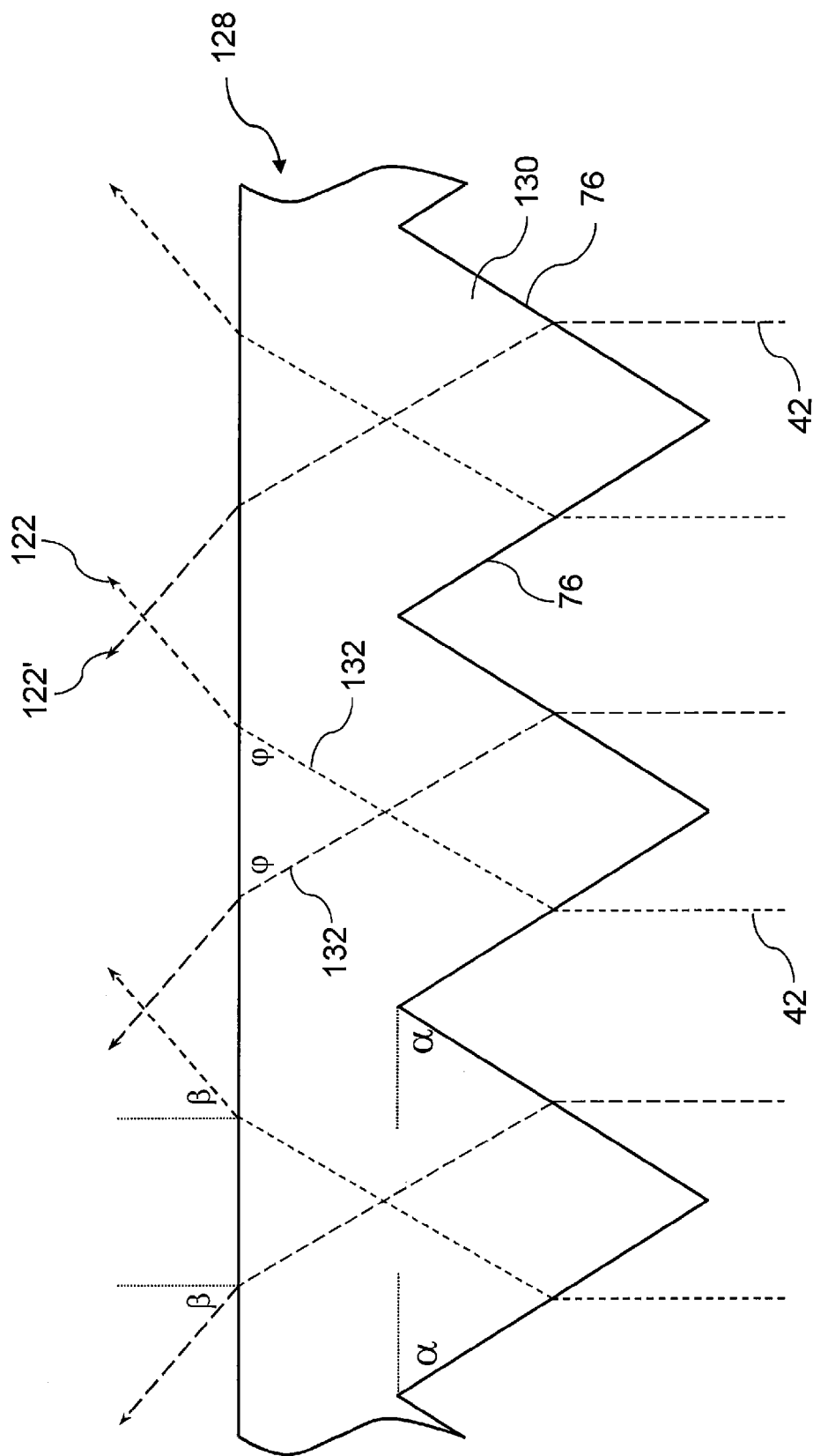
FIG. 22 illustrates a section of a prism film suitable for use as the optical splitting element in the projection system according to the third embodiment.

In one embodiment the optical splitting element 120 is in the form of a prism film 128 having a regular array of triangular prisms 130 with angled facets 76 as shown in FIG. 22. Similar to the situation illustrated in FIG. 12, the prism angle α and the angle of transmission β are related by equation (1), however in this case there is an additional constraint for the interior beam paths 132 to remain within the prisms, i.e. for them not to encounter the opposing angled facet. Geometrically, this means that the angle φ needs to be greater than or equal to the prism angle α. To obtain a transmission angle of β=45° for the beams paths 122 and 122', and assuming that the incidence and transmission side media are air ($n_1=n_3\sim1$), this additional constraint can be met with a polycarbonate prism film ($n_2=1.545$). In this specific case the prism angle α=62.1° as for the prism film 74 described above, and φ=62.8, i.e. φ>α as required. The triangular prisms 130 shown in FIG. 22 are isosceles in plan view, so that the outgoing beams 122 and 122' are deflected by the same angle. Obviously if the triangular prisms were not isosceles in cross section, the outgoing beams would be deflected by different angles.

Figure 23:
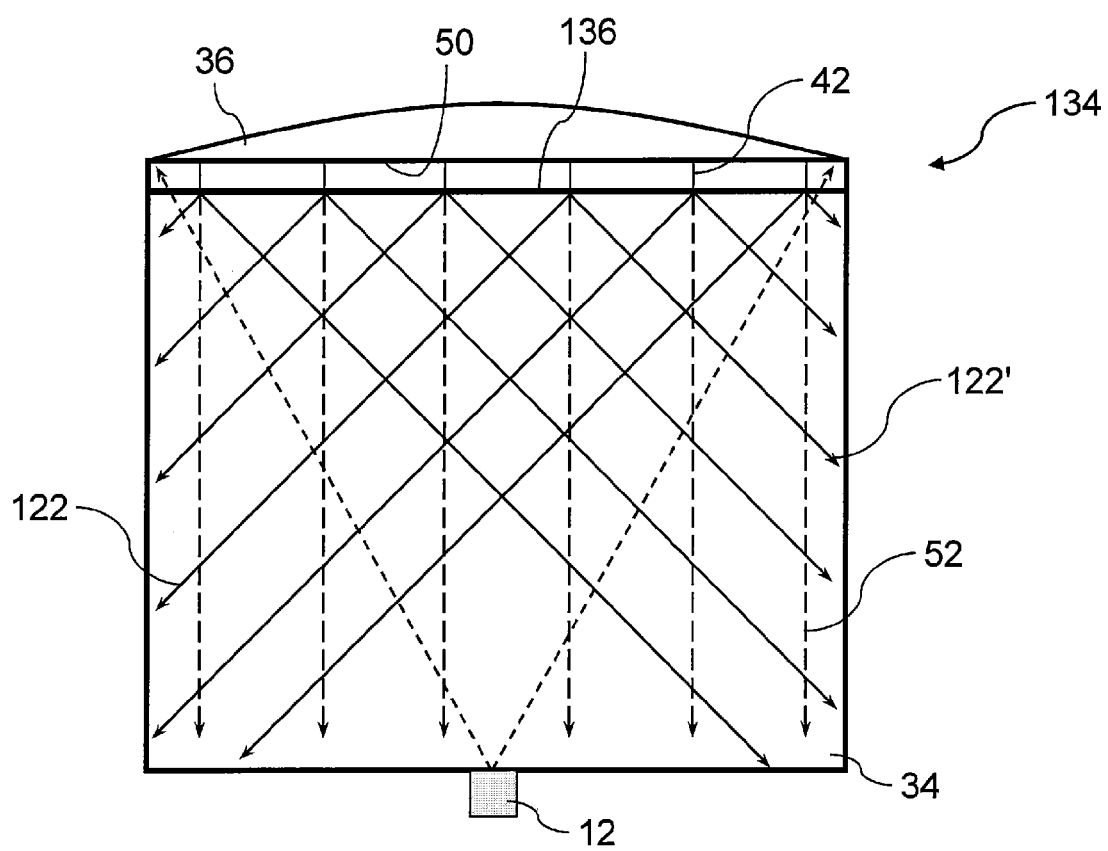
FIG. 23 illustrates in plan view a projection system according to a fourth embodiment of the present invention.
Figure 24:
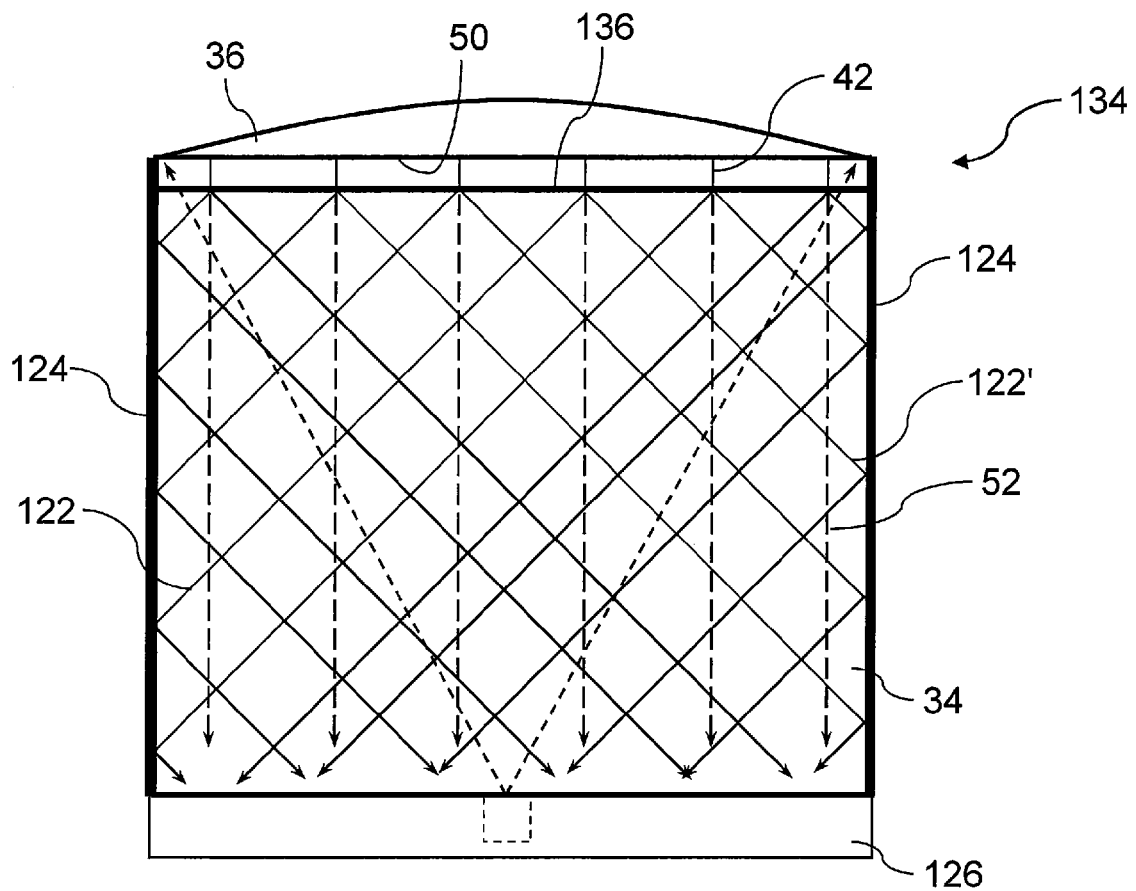
FIG. 24 illustrates in plan view how the projection system shown in FIG. 23 can be incorporated into a touch input device.

FIG. 23 shows in plan view a projection system 134 according to a fourth embodiment of the present invention. This embodiment differs from the third embodiment 118 shown in FIG. 20 in that it includes an optical splitting element 136 that splits the in-plane collimated sheet of light 42 into three sets of parallel light beams including the two sets of angled beams 122, 122' as per the third embodiment, and a set of undeflected beams 52. When this projection system 134 is incorporated with plane mirrors 124 into an infrared touch input device as shown in FIG. 24, the resulting tri-directional beam grid enables two touch objects to be located and tracked without ambiguity. In this case the receive system 126 includes receive waveguides oriented in three directions, fabricated on one, two or three substrates.

Figure 25:
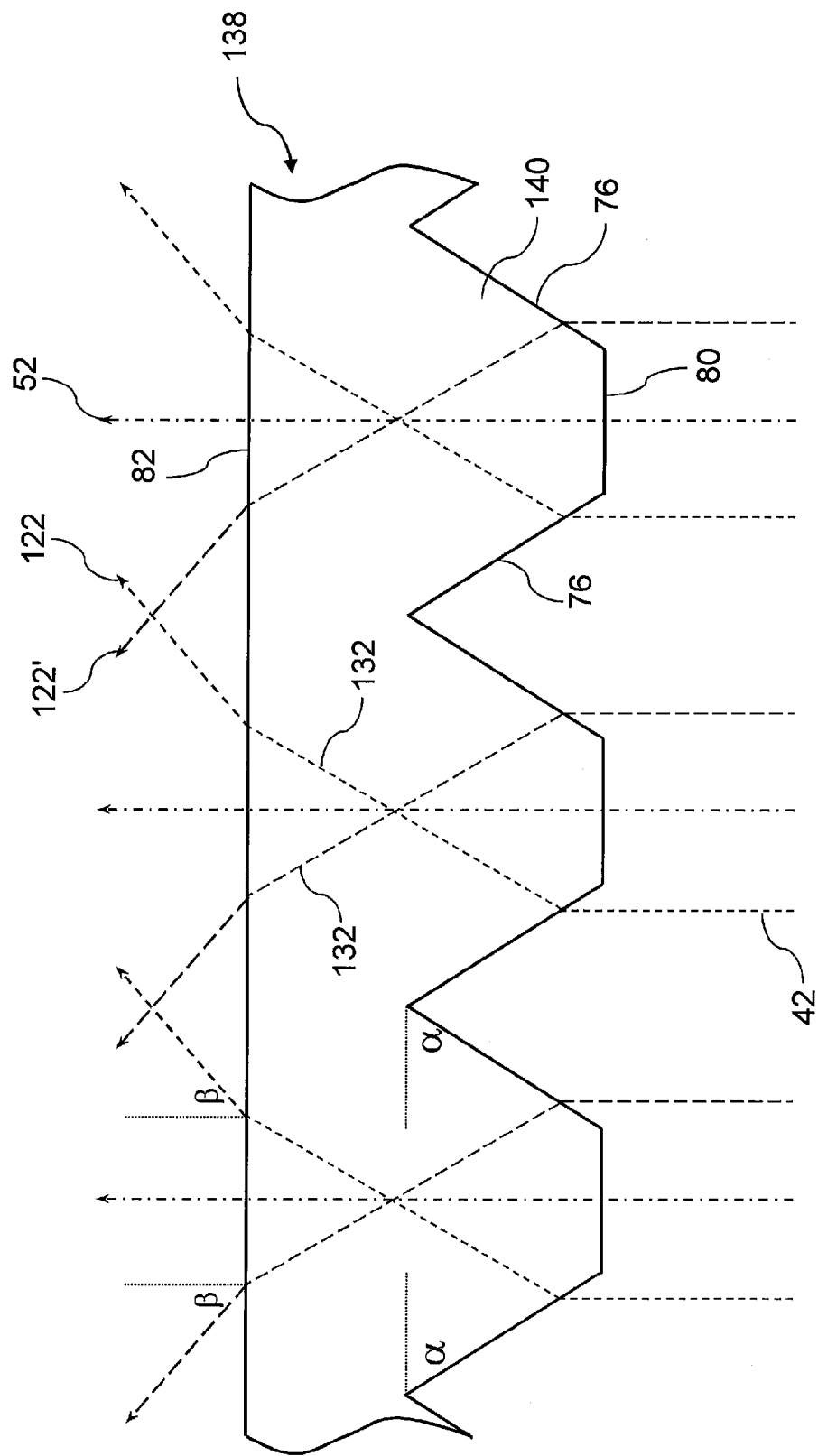
FIG. 25 illustrates a section of a prism film suitable for use as the optical splitting element in the projection system according to the fourth embodiment.

In one embodiment the optical splitting element 136 is in the form of a prism film 138 having a regular array of truncated triangular prisms 140 each with two angled facets 76 and a 'flat' facet 80 as shown in FIG. 25. Refraction of the light sheet 42 at the angled facets and again at the back surface 82 generates the angled beam paths 122 and 122', while the 'flat' facets 80 provide the undeflected beam paths 52. Alternatively or additionally, undeflected beams could be provided by placing the prisms on a larger pitch. Similar to the situation illustrated in FIG. 12, the prism angle α and the angle of transmission β are related by equation (1), and essentially the same design solution applies (if α=62.1°, $n_1=n_3\sim1$ and $n_2=1.545$, then (3=45°). Compared to the prism film 128 shown in FIG. 22, the presence of the 'flat' facets 80 relaxes the design constraints by lessening the likelihood of the interior beam paths 132 encountering the opposing angled facet. As for the prism film 74 shown in FIG. 12, a further benefit of the truncated prism shape is that there are no easily damaged sharp protruding corners.

Figure 26:
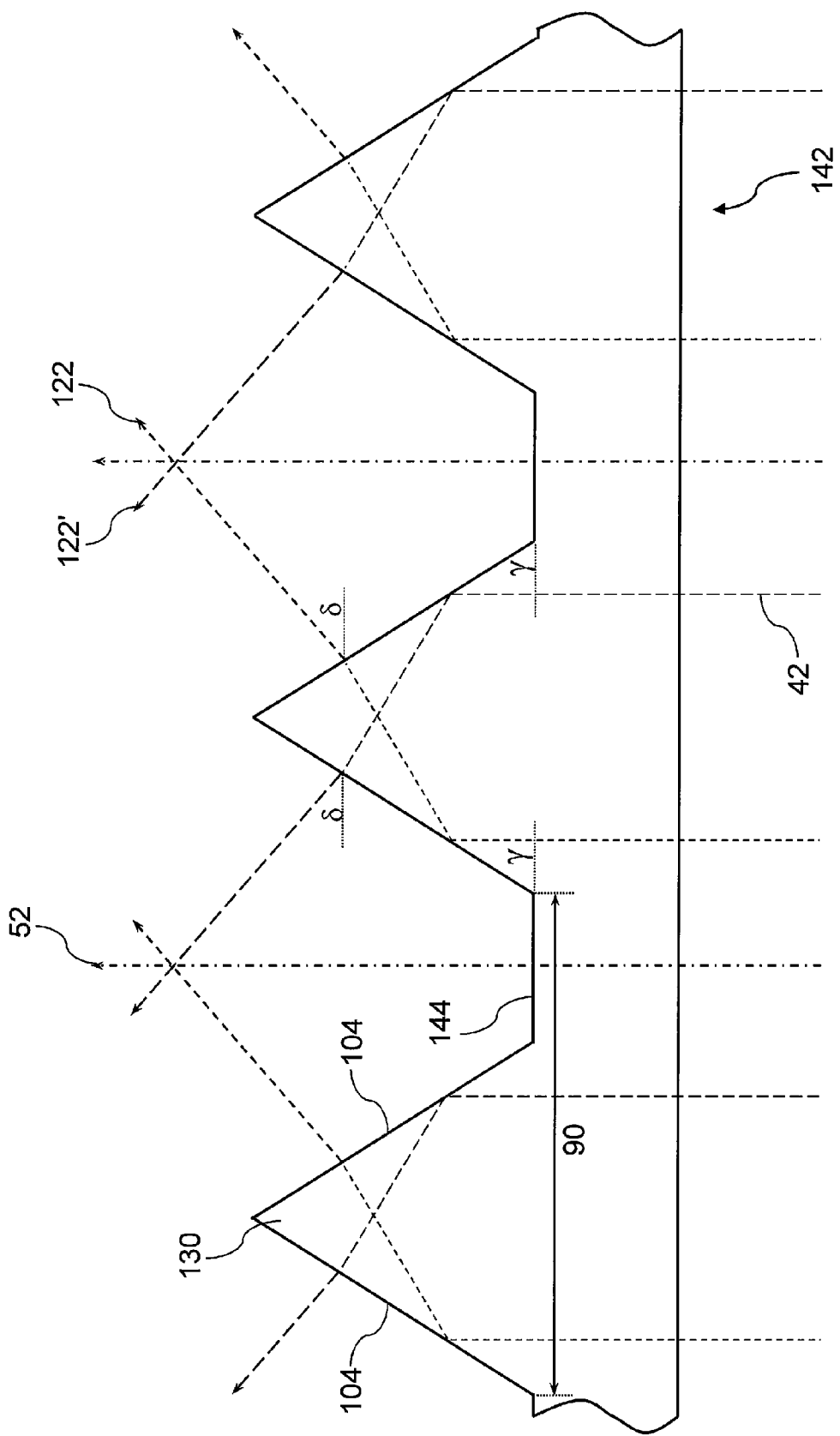
FIG. 26 illustrates a section of another prism film suitable for use as the optical splitting element in the projection system according to the fourth embodiment.

In an alternative embodiment the optical splitting element 120 is in the form of a prism film 142 having a regular array of triangular prisms 130 on a pitch 90, separated by flat portions 144 as shown in FIG. 26. In this case the angled beam paths 122 and 122' are generated by reflection at one angled facet 104 of a prism followed by refraction at the second angled facet of the prism, while the flat portions provide the undeflected beam paths 52. The prism angle γ and the angle of deflection δ are related by the equation $$n_3 \cdot \sin(\gamma + \delta - 90) = n_2 \cdot \sin(3\gamma - 180) \tag{4}$$

where $n_2$ and $n_3$ are the refractive indices of the prism film material and the transmission side medium respectively, and γ and δ are in degrees. To obtain a deflection angle of δ=45° and assuming the transmission side medium is air ($n_3$~1) and the prism film composed of a polycarbonate with $n_2$=1.545, equation (4) is satisfied for a prism angle γ=64.1°. Since the angle of incidence at the first angled facet is equal to the prism angle, which is considerably greater than the critical angle $\theta_c$=40.3° for $n_2$=1.545 and $n_3$=1, total internal reflection will occur. It should be noted that in this embodiment of a prism film the flat portions 144 need to be sufficiently wide to prevent the angled beam paths 122 and 122' from encountering the adjacent prism.

In all of the above examples where the optical splitting element is in the form of a prism film, the refractive index of the prism film material, $n_2$, appears in the relevant design equation for the angle at which the refracted beams emerge. In general, the refractive index of a material varies with wavelength (via material dispersion) and also with temperature (via the thermo-optic effect), so that the situation of well-defined skew beam directions as shown for example in FIGS. 12, 16, 22, 25, 26 and 29 is in fact an idealisation. Dispersion will impose some degree of divergence on the refracted beams, depending on the bandwidth of the optical source, while the thermo-optic effect will cause some degree of beam 'walk off' due to temperature variations. Although both effects have the potential to interfere with the detection of the skew beams in a touch screen implementation, it turns out that they are in fact minor To demonstrate this, we will consider the impact of these two effects on a prism film 74 as shown in FIG. 12. This prism film design represents a 'worst case' because the skew beams are refracted twice, whereas in the prism film designs shown in FIGS. 16 and 26 the skew beams are only refracted once. Variations in $n_2$ have negligible effect for the prism film design shown in FIG. 26, because refraction at the surface 104 occurs at near normal incidence.

By way of example, the magnitude of the material dispersion effect will be evaluated for a polycarbonate prism film 74 as shown in FIG. 12, and assuming an LED light source with a bandwidth of 30 nm centred on 850 nm. Following a fitting procedure described in S. E. Caudill and W. J. Grubbs 'Interferometric Measurements of Refractive Index Dispersion in Polymers over the Visible and Near-Infrared Spectral Range', *Journal of Applied Polymer Science* vol 100(1) pp 65-72 (2006), the refractive index of polycarbonate can be estimated to be 1.5456 and 1.5434 at 835 nm and 865 nm respectively. This variation is minor because material dispersion is small in spectral regions of transparency. For a prism angle α=62.1°, chosen for $n_2$=1.545 as described above, the deflection angle β will only vary from 44.81° (for $n_2$=1.5434, 865 nm) to 45.00° (for $n_2$=1.5456, 835 nm), well within the acceptance angle of typical in-plane lenses on the receive side of a touch input device.

Turning now to the influence of temperature variations on the deflection angle, we will use a literature value of −0.9× $10^{-4}$/° C. for the thermo-optic coefficient of polycarbonate (Z. Zhang et al 'Thermo-optic Coefficients of Polymers for Optical Waveguide Applications', *Polymer* vol 47 pp 4893-4896 (2006)). Again considering a prism film 74 with prism angle α=62.1°, we find that for 850 nm light, the deflection angle β will only vary from 45.26° to 44.48° over a temperature range −20 to 100° C., again well within the acceptance angle of typical in-plane lenses.

Figure 27:
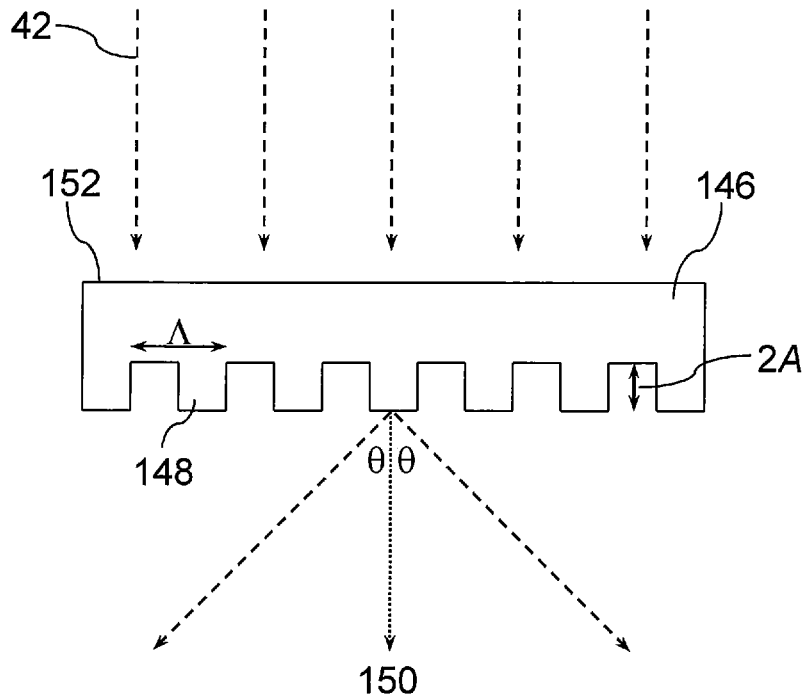
FIG. 27 illustrates a section of a phase mask suitable for use as the optical splitting element in the projection system according to the third embodiment.

In alternative embodiments, the optical splitting element may be a diffractive element instead of a refractive element such as a prism film. One type of diffractive element is a phase mask. FIG. 27 shows in plan view a phase mask 146 suitable for use as the optical splitting element 120 in a third embodiment projection system 118 as shown in FIG. 20. The phase mask may for example be composed of a suitably transparent polymer, and contains a surface relief grating having a series of square teeth 148 with depth 2A on a pitch Λ. When a sheet of collimated light 42 impinges on this phase mask, it is diffracted into multiple orders 0, ±1, ±2 . . . according to standard diffraction theory. The amount of light coupled into each order can be controlled to some extent by careful design of the surface relief grating. For example, assuming the surrounding medium is air (n~1), the zero order 150 can be suppressed for a given wavelength λ by choosing the grating depth 2A and the phase mask refractive index $n_2$ to satisfy the following equation:

$$\frac{4\pi(n_2 - 1)A}{\lambda} = \pi \tag{5}$$

In this case, the majority of the incident light will be coupled into the ±1 orders, with diffraction angle θ determined by the wavelength and the grating pitch Λ according to:

$$\Lambda = \frac{\lambda}{2\sin\theta} \tag{6}$$

These two orders would form the split beams 122, 122' as shown in FIG. 20. For example if the required diffraction angle and the incident wavelength were 45° and 850 nm respectively, the grating pitch would need to be 601 nm. Furthermore if the phase mask is composed of polycarbonate ($n_2$=1.545 at 850 nm), the zero order 150 will be suppressed according to eqn (5) if 2A=780 nm.

The grating teeth 148 are shown as square in FIG. 27, but other periodic shapes such as a sinusoidal pattern will also suffice. Although FIG. 27 shows the collimated light sheet 42 impinging on the planar surface 152 of the phase mask, the diffraction works equally well if the collimated light sheet impinges on the grating side of the phase mask, with a small adjustment in the grating pitch required to account for refraction of the diffracted beams at the planar surface 152. For a touch input device configuration, a phase mask 146 could be incorporated in an analogous fashion to the prism films 74 or 100 as shown in FIGS. 15 and 18 respectively.

Figure 28:
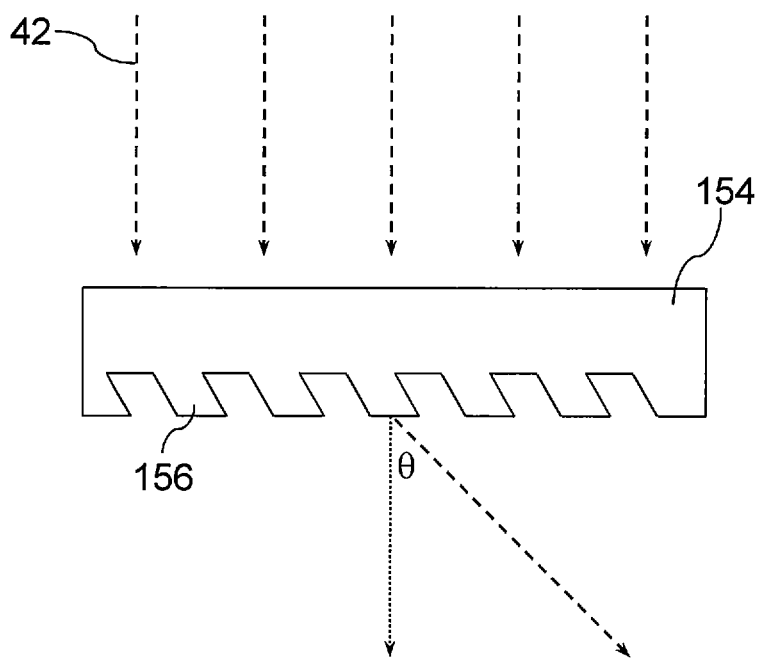
FIG. 28 illustrates a section of a phase mask suitable for use as the optical splitting element in the projection system according to the first embodiment.

Several variant phase mask designs will occur to those skilled in the art. For example if the grating depth is chosen such that a significant amount of incident light is coupled into the zero order as well as into the ±1 orders, then a phase mask could serve as the 'three beam' optical splitting element 136 in the fourth embodiment projection system shown in FIG. 23. A blazed phase mask 154 with angled teeth 156, illustrated schematically in FIG. 28 and designed to diffract an incident collimated light sheet 42 into the 0 and +1 orders, could be used as the optical splitting element 56 in the first embodiment projection system shown in FIG. 9.

Figure 30A:
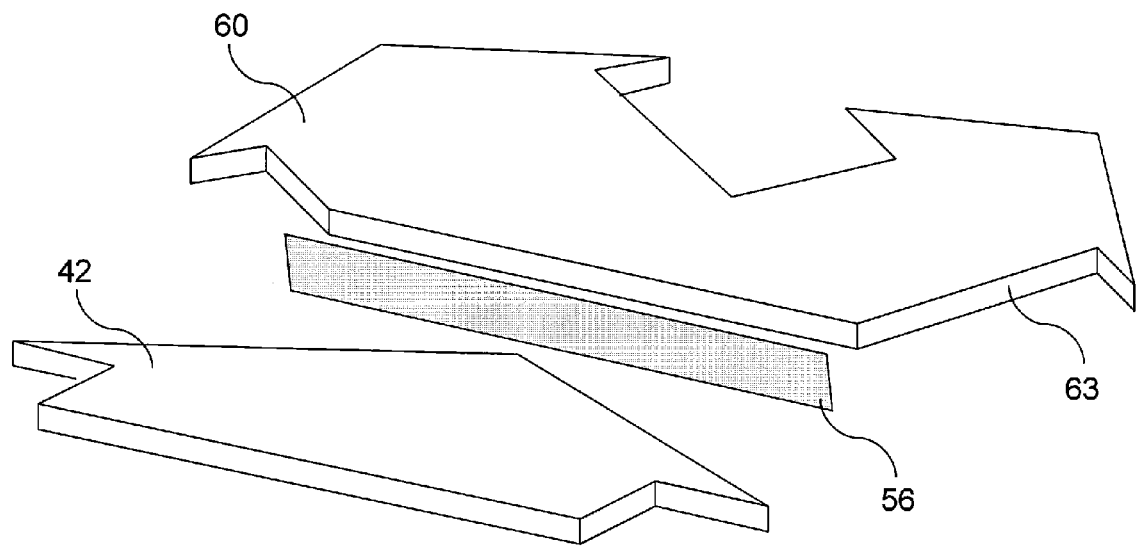
FIG. 30A illustrates a sheet of substantially planar substantially collimated light incident upon an optical splitting element, with portions being split into the first and second directions.
Figure 30B:
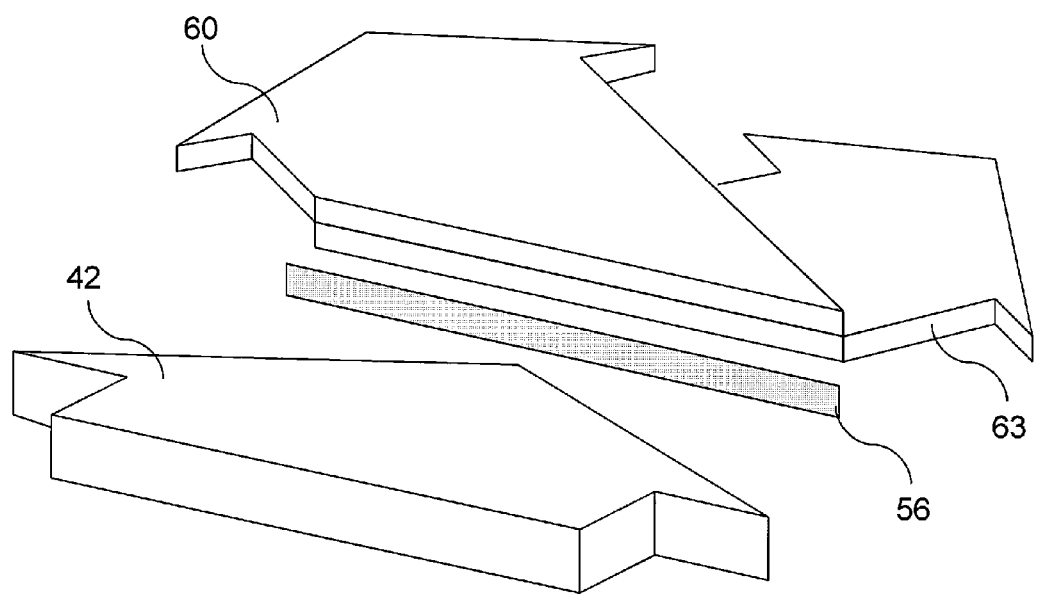
FIG. 30B illustrates an alternative embodiment where a sheet of substantially planar substantially collimated light incident upon an optical splitting element, is split into a lower portion propagating in the first direction and an upper portion propagating in a second direction.
Figure 31A:
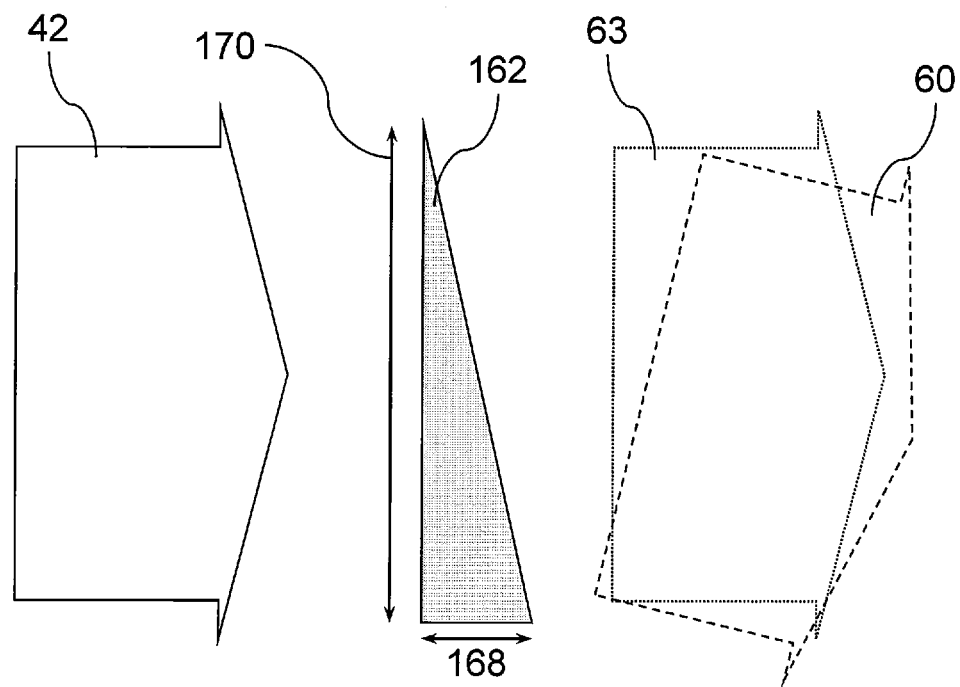
FIGS. 31A and 31B illustrate in plan view and side view the positioning of an optical splitting element in the form of a simple prism, suitable for the embodiment shown in FIG. 30B.
Figure 31B:
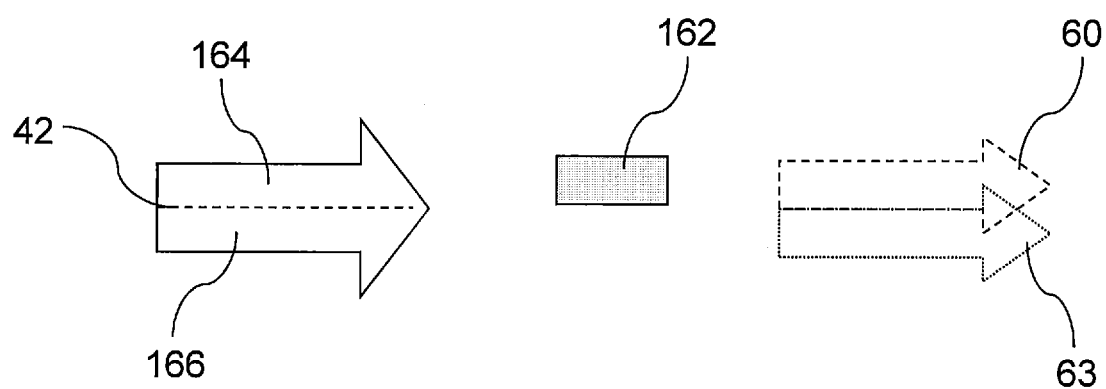

In each of the previously described example embodiments, and as shown schematically in FIG. 30A, an optical splitting element 56 such as a prism film or phase mask splits an incident light sheet 42 into two pluralities of parallel beams, represented by 'sheets' of light 60 and 63, propagating in different directions. In effect the light sheet is 'sliced' horizontally. As shown schematically in FIG. 30B, it is also possible for an optical splitting element 56 to 'slice' a light sheet 42 vertically to form two 'sheets' of light 60 and 63, each of which may be continuous or composed of a plurality of parallel beams. In one preferred embodiment shown in plan view and side view in FIGS. 31A and 31B respectively, an optical splitting element in the form of a simple prism 162 is positioned to receive an upper portion 164 of an incident light sheet 42 and deflect it to produce a 'skew' light sheet 60, while the lower portion 166 continues on to form a 'straight' light sheet 63. In this particular embodiment both the 'skew' and 'straight' light sheet 60 will be continuous.

Figure 32:
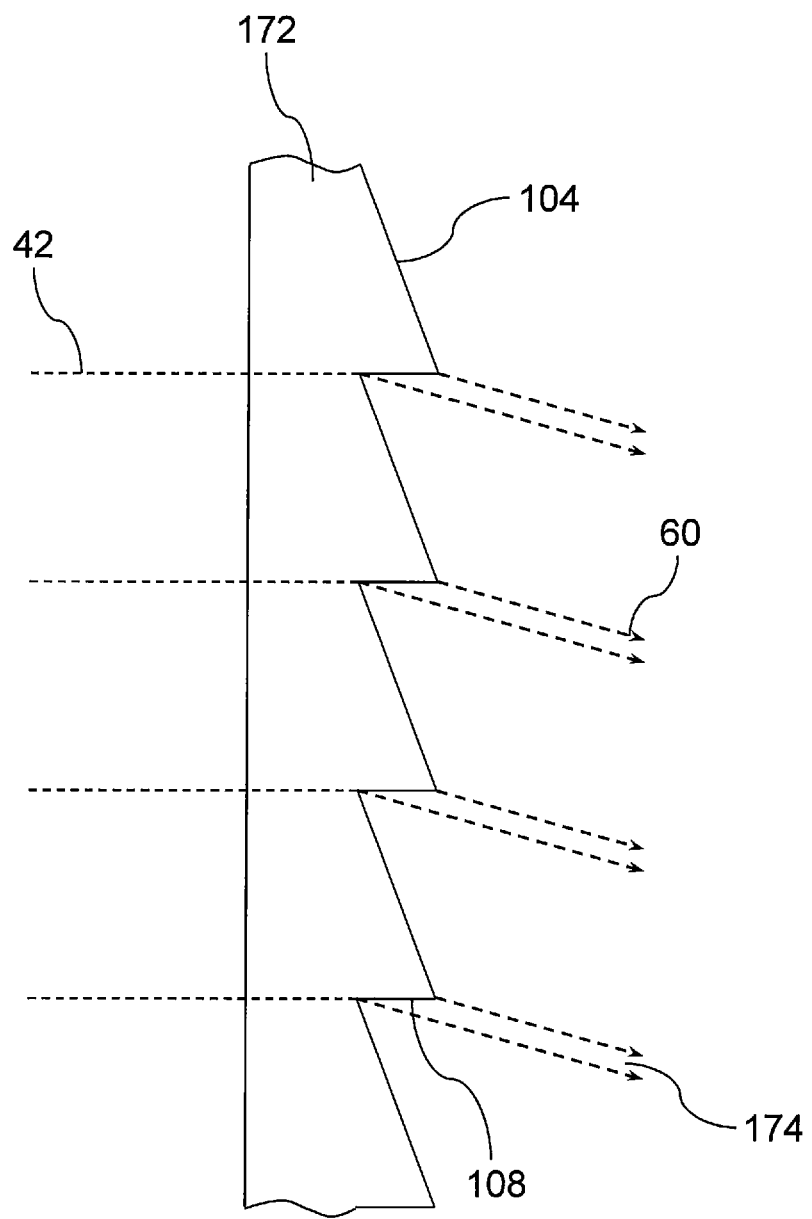
FIG. 32 illustrates in plan view an optical splitting element in the form of a prism film, suitable for the embodiment shown in FIG. 30B.

An optical splitting element in this form, however, would be impractical in situations (e.g. along the sides of a touch input device as shown in FIG. 9) where the depth 168 of the optical splitting element has to be much less than its length 170. An optical splitting element in the form of a prism film or phase mask would be more suitable in such situations. In one embodiment shown in plan view in FIG. 32, the optical splitting element is in the form of a prism film 172, similar to the prism film 160 shown in FIG. 29 except the angled facets 104 are close spaced. In this case the 'skew' light sheet 60 will not be continuous because the vertical facets 108 cause breaks 174.

There are also situations where two or more prism films could be stacked and positioned to receive different portions of an incident light sheet, to generate multiple sets of beams or light sheets. In one example, a stack of two prism films 74 shown in FIG. 13B, one a mirror image of the other, could be used as an alternative to the prism film 138 shown in FIG. 25.

It will be appreciated that the illustrated embodiments provide projection systems for improved infrared touch input devices, with the improvement lying in either enhanced multi-touch capability or reduced bezel width.

Although the invention has been described with reference to specific examples, it will be appreciated by those skilled in the art that the invention may be embodied in many other forms.

The invention claimed is:

1. A projection system for a touch input device, said projection system comprising:
   a first light emitter adapted to emit substantially planar substantially collimated light propagating in a first direction; and
   an optical splitting element adapted to split at least a portion of said substantially planar substantially collimated light into a second direction, different from said first direction,
   wherein said light in said first direction and said second direction are oriented to propagate between 30 and 60 degrees relative to each other from the optical splitting element.

2. A projection system according to claim 1 wherein said first and second directions are parallel to the plane of the input area of said touch input device.

3. A projection system according to claim 1 wherein said optical splitting element splits an upper or lower portion of said substantially planar substantially collimated light into said second direction.

4. A projection system according to claim 1 wherein said optical splitting element splits a plurality of portions of said substantially planar substantially collimated light to produce a plurality of substantially parallel beams of light propagating in said second direction.

5. A projection system according to claim 1 wherein said optical splitting element comprises a prism film or a phase mask.

6. A projection system according to claim 1 wherein said first and second directions are oriented at about 45 degrees to each other.

7. A projection system according to claim 1 wherein said optical splitting element is further adapted to split at least a portion of said substantially planar substantially collimated light into a third direction, different from said first and said second directions.

8. A projection system according to claim 7 wherein said second and said third directions are oriented at about 90 degrees to each other.

9. A projection system according to claim 7 wherein the input area of said input device is rectangular, with first and fourth mutually opposing sides and second and third mutually opposing sides, wherein said first light emitter is positioned along said first side and mutually opposed first and second reflectors are positioned along said second and third sides respectively, the arrangement being such that light propagating in said second direction is reflected off the relevant reflector and received in a first set of detectors positioned along said fourth side, and light propagating in said third direction is reflected off the relevant reflector and received in a second set of detectors positioned along said fourth side.

10. A projection system according to claim 1 wherein a second light emitter is provided which is adapted to emit substantially planar substantially collimated light propagating in a fourth direction.

11. A projection system according to claim 10 wherein said fourth direction is at substantially 90 degrees to said first direction.

12. A projection system according to claim 10 wherein an optical splitting element is provided adjacent the second light emitter, and is adapted to split at least a portion of said substantially planar substantially collimated light propagating in said fourth direction into a fifth direction, different from said fourth direction.

13. A projection system according to claim 12 wherein said fourth and fifth directions are oriented at about 45 degrees to each other.

14. A projection system according to claim 1 wherein said first light emitter comprises a transmissive element adapted to receive, confine and transmit an optical signal in planar form, a collimation element adapted to substantially collimate an optical signal, and a redirection element adapted to redirect an optical signal, wherein said elements are arranged to receive an optical signal from an optical source and transmit, collimate and redirect the optical signal to produce a substantially collimated signal in a substantially planar form.

15. A projection system according to claim 1 wherein said first and second light emitters comprise a transmissive body comprising a transmissive element adapted to receive, confine and transmit an optical signal in planar form, and collimation and redirection elements adapted to substantially collimate and redirect optical signals, wherein the elements are arranged to receive first and second optical signals from one or more optical sources and transmit, collimate and redirect said first and second optical signals to produce substantially collimated signals in substantially planar form propagating in said first and fourth directions, respectively.

16. A projection system for a touch input device, said projection system comprising:
   a transmissive body comprising:
     a collimation element adapted to substantially collimate an optical signal; and a redirection element adapted to substantially redirect an optical signal, wherein said collimation and redirection elements are arranged to receive a substantially planar optical signal and collimate and redirect said optical signal to produce a substantially collimated substantially planar signal propagating in a first direction; and an optical splitting element adapted to split at least a portion of said substantially collimated substantially planar signal into a second direction, different from said first direction, wherein said optical signal in said first direction and said second direction are oriented to propagate between 30 and 60 degrees relative to each other from the optical splitting element.

17. A projection system for a touch input device, said projection system comprising:

a transmissive body comprising a collimation and redirection element adapted to receive a substantially planar optical signal and collimate and redirect said optical signal to produce a substantially collimated substantially planar signal propagating in a first direction; and an optical splitting element adapted to split at least a portion of said substantially collimated substantially planar signal into a second direction, different from said first direction, wherein said optical signal in said first direction and said second direction are oriented to propagate between 30 and 60 degrees relative to each other from the optical splitting element.

18. A touch input device comprising the projection system according to claim 17.

19. A method for producing an input signal for an input device, said method comprising the steps of:

providing a substantially planar substantially collimated optical signal propagating in a first direction;

splitting at least a portion of said substantially planar substantially collimated optical signal into a second direction, different from said first direction; and receiving said optical signals propagating in said first and second directions in corresponding light detecting elements for detecting an input, wherein said optical signal in said first direction and said second direction are oriented to propagate between 30 and 60 degrees relative to each other after the splitting thereof.

* * * * *